United States Patent
Rangapuram et al.

(10) Patent No.: US 11,281,969 B1
(45) Date of Patent: Mar. 22, 2022

(54) ARTIFICIAL INTELLIGENCE SYSTEM COMBINING STATE SPACE MODELS AND NEURAL NETWORKS FOR TIME SERIES FORECASTING

(71) Applicant: Amazon Technologies, Inc., Seattle, WA (US)

(72) Inventors: Syama Rangapuram, Berlin (DE); Jan Alexander Gasthaus, Berlin (DE); Tim Januschowski, Berlin (DE); Matthias Seeger, Berlin (DE); Lorenzo Stella, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 666 days.

(21) Appl. No.: 16/116,631

(22) Filed: Aug. 29, 2018

(51) Int. Cl.
| | |
|---|---|
| *G06N 3/08* | (2006.01) |
| *G06N 7/00* | (2006.01) |
| *G06Q 10/04* | (2012.01) |
| *G06F 17/13* | (2006.01) |
| *G06K 9/62* | (2006.01) |

(52) U.S. Cl.
CPC .............. *G06N 3/08* (2013.01); *G06F 17/13* (2013.01); *G06K 9/6256* (2013.01); *G06N 7/005* (2013.01); *G06Q 10/04* (2013.01)

(58) Field of Classification Search
CPC . G06N 3/02; G06N 3/08; G06N 7/005; G06F 17/13; G06K 9/6256; G06Q 10/04
See application file for complete search history.

(56) References Cited

U.S. PATENT DOCUMENTS

| | | | |
|---|---|---|---|
| 5,815,413 A | 9/1998 | Hively et al. | |
| 7,124,055 B2 | 10/2006 | Breiman | |
| 7,490,287 B2 | 2/2009 | Sakurai | |
| 2006/0217939 A1* | 3/2006 | Nakata et al. | G06F 15/00 702/189 |
| 2014/0108094 A1 | 4/2014 | Beddo et al. | |
| 2019/0228223 A1* | 7/2019 | McKenna et al. | G06T 7/0002 |
| 2019/0228296 A1* | 7/2019 | Gefen et al. | G06N 3/08 |
| 2019/0354836 A1* | 11/2019 | Shah et al. | G06N 3/0445 |
| 2020/0065667 A1* | 2/2020 | Agarwal et al. | G06N 3/08 |

FOREIGN PATENT DOCUMENTS

KR  101828215  2/2018

OTHER PUBLICATIONS

Syama Sundar Rangapuram, Matthias Seeger, Jan Gasthaus, Lorenzo Stella, Yuyang Wang, Tim Januschowski "Deep State Space Models for Time Series Forecasting" NeurIPS 2018 (Year: 2018).*

(Continued)

*Primary Examiner* — Rehana Perveen
*Assistant Examiner* — Nupur Debnath
(74) *Attorney, Agent, or Firm* — Robert C. Kowert; Kowert, Hood, Munyon, Rankin & Goetzel, P.C.

(57) ABSTRACT

A composite time series forecasting model comprising a neural network sub-model and one or more state space sub-models corresponding to individual time series is trained. During training, output of the neural network sub-model is used to determine parameters of the state space sub-models, and a loss function is computed using the values of the time series and probabilistic values generated as output by the state space sub-models. A trained version of the composite model is stored.

22 Claims, 12 Drawing Sheets

(56) References Cited

OTHER PUBLICATIONS

Guokun Lai, Wei-Cheng Chang, Yiming Yang, Hanxiao Liu; "Modeling Long- and Short-Term Temporal Patterns with Deep Neural Networks"; LSTNet (Year: 2017).*

Yaguang Li, Rose Yu, Cyrus Shahabi, Yan Liu; "Diffusion Convolutional Recurrent Neural Network: Data-Driven Traffic Forecasting" ICLR 2018 (Year: 2018).* http://www.bearcave.com/finance/random_r_hacks/kalman_smooth.html, "Smoothing a Time Series with a Kalman Filter in R", 2013, pp. 1-4.

Nesreen K. Ahmed, et al., "An Empirical Comparison of Machine Learning Models for Time Series Forecasting", Taylor & Francis, Online publication date Sep. 15, 2010, pp. 594-621.

http://www.mathworks.com/help/ident/ug/estimating-state-space-time-series-models.html, "Estimate StateSpace TimeSeries Models", Download Jan. 25, 2015; pp. 1-2.

http://www.eviews.com/Learning/index.html, "EViews Tutorials", Downloaded Feb. 4, 2015, pp. 1-2.

https://www.estima.com/ratsmain.shtml. "Product Information RATS: Introduction", Estima, Updated Feb. 4, 2015, pp. 1-2.

Siem Jan Koopman, et al., "Statistical algorithms for models in state space using SsfPack 2.2", Econometrics Journal, 1999, pp. 107-160, vol. 2.

Eric Zivot, "State Space Models and the Kalman Filter", Apr. 9, 2006, pp. 1-8.

David Sheung Chi Fung, "Methods for the Estimation Of Missing Values in Time Series", Edith Cowan University, 2006, pp. 1-202.

Giovanni Petris, "An R Package for Dynamic Linear Models", Journal of Statistical Software, Oct. 2010, pp. 1-16, vol. 36, Issue 12.

Giovanni Petris, et al., "State Space Models in R", Journal of Statistical Software, May 2011, pp. 1-25, vol. 41, Issue 4.

William R. Bell, "REGCMPNT {A Fortran Program for Regression Models with ARIMA Component Errors", Journal of Statistical Software, May 2011, pp. 1-23, vol. 41, Issue 7.

http://www.mathworks.com/help/ident/ug/whatarestatespacemodels.html, "What Are State-Space Models?", Downloaded Jan. 25, 2015, pp. 1-2.

Eric Zivot, et al., "Time Series Forecasting with State Space Models", University of Washington, Department of Applied Mathematics, 2012, pp. 1-90.

Sy Lvain Arlot, et al., "A survey of cross-validation procedures for model selection", Statistics Surveys, 2010, pp. 4:40-79, vol. 4.

Trevor Hastie, et al., "The Elements of Statistical Learning: Data Mining, Inference, and Prediction", Springer Series in Statistics, pp. 214-217, Second Edition.

C.K. Chu, et al., "Comparison of Two Bandwidth Selectors with Dependent Errors", The Annal of Statistics, 1991. pp. 1906-1918, vol. 19, No. 4.

Hirotugu Akaike. "Fitting Autoregressive Models for Prediction", Annals of the institute of Statistical Mathematics, 1969, p. 243-247, 21(1).

Petar M. Djuric, et al., "Order Selection of Autoregressive Models", IEEE, Nov. 1992, pp. 2829-2833, vol. 40, No. 11.

Ciprian Doru Giurcaneanu, et al., "Estimation of AR and ARMA models by stochastic complexity", Lecture Notes—Monograph Series, 2006, pp. 48-59, vol. 52.

Konstantinos Konstantinides, "Threshold Bounds in SVD and a New Iterative Algorithm for Order Selection in AR Models", IEEE Transactions on signal processing, 1991, pp. 1218-1221.

Clifford M. Hurvich, et al., "Regression and Time Series Model Selection in Small Samples", Biometrika, Jun. 1989, pp. 297-307, vol. 76, No. 2.

Tetiana Stadnyiska, et al., "Comparison of automated procedures for ARMA model identification", Behavior Research Methods, 2008, pp. 250-262, vol. 40 No. 1.

Rob J. Hundman, et al., "Automatic time series forecasting: the forecast package for R", Monash, University, Department of Econometrics and Business Statistics, Jun. 2007, pp. 1-29.

Robert H. Shumway, et al., "Time Series Analysis and Its Applications With R Examples", Springer Science & Business Media, 2010, 1-171; 559-576.

G. Gardner, et al., "Algorithm AS 154: An Algorithm for Exact Maximum Likelihood Estimation of Autoregressive-Moving Average Models by Means of Kalman Filtering", Applied Statistics, 1980, pp. 311-322, vol. 29, Issue 3.

David S. Stoffer, et al., "Bookstrapping State-Space Models: Gaussian Maximum Likelihood Estimation and the Kalman Filter", Journal of the American Statistical Association, 1991, pp. 1024-1033, vol. 86, No. 416.

Andrew C, Harvey, et al., "Diagnostic Checking of Unobserved-Components Time Series Models", Journal of Business & Economic Statistics, Oct. 1992, pp. 377-389, vol. 10, No. 4.

Giovanni Petris, et al., "Dynamic Linear Models with R", Springer, May 2009, pp. 31-32.

Hui Zou, et al., "Regularization and variable selection via the elastic net", Journal of the Royal Statistical, Dec. 2003, pp. 301-320.

Andrew Harvey, "Forecasting with Unobserved Components Time Series Models", Handbook of Economic Forecasting, 2006, pp. 1-89.

James Durbin, et al., "Time Series Analysis by State Space Methods", Oxford University Press, May 2012, pp. 1-9.

Leonard J. Tashman, "Out-of-sample tests of forecasting accuracy: an analysis and review", International Journal of Forecasting, 2000, pp. 437-450, vol. 16, No. 4.

J. Rissanen, "Modeling By Shortest Data Description", Automatica, 1978, pp. 465-471, vol. 14, No. 5.

Mati Wax, "Order Selection for AR Models by Predictive Least Squares", IEEE Transactions on Acoustics, Speech, and Signal Processing, Apr. 1988, pp. 581-588, vol. 36, No. 4.

James R. Dickie, et al., "A comparative study of AR order selection methods", Signal Processing, Jan. 13, 1994, pp. 239-255, vol. 40, No. 2.

Piet De Jong, "The likelihood for a state space model", Biometrika, 1988, pp. 165-169, vol. 75, No. 1.

Robert Kohn, et al., "Estimation, Prediction, and Interpolation for ARIMA Models With Missing Data", Journal of the American Statistical Association, Sep. 1986, pp. 751-761, vol. 81, No. 395.

U.S. Appl. No. 15/153,713, filed May 12, 2016, Seeger, et al.

U.S. Appl. No. 15/417,070, filed Jan. 26, 2017, Valentin Flunked, et al.

U.S. Appl. No. 15/458,645, filed Mar. 14, 2017, Andrew Christopher Chud.

U.S. Appl. No. 15/441,896, filed Feb. 24, 2017, Jan Alexander Gasthaus et al.

Xiangrui Meng, et al., "MLlib: Machine Learning in Apache Spark", Journal of Machine Learning Research 17, 2016, pp. 1-7.

Martin Jaggi, et al., "Communication-Efficient Distributed Dual Coordinate Ascent", Retrieved from URL: http://arxiv.org/abs/1409.1458v2, pp. 1-15.

Alexander Alexandrov, et al., "The Stratosphere platform for big data analytics", The VLDB Journal, Published online May 6, 2014, Springer, pp. 1-26.

Mikhail Bilenko, et al., "Towards Production-Grade, Platform-Independent Distributed ML", Proceedings of the 33rd International Conference on Machine Learning, 2016, pp. 1-5.

Matthias Seeger, et al., "Bayesian Intermittent Demand Forecasting for Large Inventories", 30th Conference on Neural Information Processing Systems (NIPS 2016), 2016, pp. 1-9.

Ronnie Chaiken, et al., "SCOPE: Easy and Efficient Parallel Processing of Massive Data Sets", PVLDB '08, Aug. 23-28, 2008, ACM, pp. 1265-1276.

Yossi Arjevani, et al., "Communication Complexity of Distributed Convex Learning and Optimization", Retrieved from URL: http://arxiv.org/abs/1506.01900v2, pp. 1-27TIM Kraska, et al., "MLbase: A Distributed Machine-learning System", CIDR 2013, 6th Biennial Conference on Innovative Data Systems Research, pp. 1-7.

Tim Kraska, et al., "MLbase: A Distributed Machine-learning System", CIDR 2013, 6th Biennial Conference on Innovative Data Systems Research, pp. 1-7.

Abhay Jha, et al., "Clustering to Forecast Sparse Time-Series Data", 2015 IEEE 31st International Conference, 2015, pp. 1388-1399.

(56) References Cited

OTHER PUBLICATIONS

Valentin Flunked et al. "DeepAR: Probabilistic Forecasting with Autoregressive Recurrent Networks" Jul. 5, 2017, pp. 1-11.
Aaron Van Den Oord et al. "Wavenet: A Generative Model for Raw Audio" pp. 1-15.
U.S. Appl. No. 14/662,021, filed Mar. 18, 2015, Gregory Michael Duncan.
U.S. Appl. No. 15/417,070, filed Jan. 26, 2017, Valentin Flunked.
"ISF 2014 Economic Forecasting-Past, Present and Future", Foresight Fall 2013, Issue 31, The International Journal of Applied Forecasting, 2013, pp. 1-56.
Vinayak Borkar, et al., "Hyracks: A Flexible and Extensible Foundation for Data-Intensive Computing", Data Engineering (ICDE), 2011 IEEE 27th International Conference, pp. 1151-1162.
"KeystoneML", Retrieved from URL: http://keystoneml.org/index.html on Jan. 10, 2017, pp. 1-4.
Arun Kumar, et al., "Model Selection Management Systems: The Next Frontier of Advanced Analytics", ACM SIGMOD, Record 44.4, 2016, pp. 17-22.
Jimmy Lin, et al., "Large-Scale Machine Learning at Twitter", SIGMOD '12, May 20-24, 2012, pp. 793-804.
Amazon Web Services, "Amazon Machine Learning Developer Guide Version Latest", Updated Aug. 2, 2016, pp. 1-146.
Ce Zhang, et al., "Materlialization Optimizations for Feature Selection Workloads", SIGMOD '14, Jun. 22-27, 2014, pp. 1-12.
Cheng-Tao Chu, et al., "Map-Reduce for Machine Learning on Multicore", In Advances in Neural Information Processing Systems, 2007, pp. 281-288.
Matei Zaharia, et al., "Resilient Distributed Datasets A Fault-Tolerant Abstraction for In-Memory Cluster Computing", amplab UC Berkeley, 2012, pp. 1-30.
Matei Zaharia, et al., "Resilient Distributed Datasets A Fault-Tolerant Abstraction for In-Memory Cluster Computing", Proceedings of the 9th USENIX Conference on Networked Systems Design and Implementation, pp. 1-30.
Matthias Boehm, et al., "Hybrid Parallelization Strategies for Large-Scale Machine Learning in SystemML", Proceeding of the VLDB Endowment, vol. 7, No. 7, 40th International Conference on Very Large Data Bases, Sep. 1-5, 2014, pp. 553-564.
Yucheng Low, et al., "Distributed GraphLab: A Framework for Machine Learning and Data Mining in the Cloud", The 38th International Conference on Very Large Data Bases, Aug. 27-31, 2012, pp. 716-727.
Fabian Pedregosa, et al., "Scikit-learn Machine Learning in Python", Journal of Machine Learning Research 12, 2011, pp. 2825-2830.
D. Sculley, et al., "Hidden Technical Debt in Machine Learning Systems", In Advances in Neural Information processing Systems, 2015, pp. 2503-2511.
Michael Armbrust, et al., "Spark SQL: Relational Data Processing in Spark", ACM, SIGMOD '15, May 31-Jun. 4, 2015, pp. 1-12.
Amol Ghoting, et al., "SystemML: Declarative Machine Learning on MapReduce", In Data Engineering (ICDE), 2011 IEEE 27th International Conference on, pp. 231-242.
U.S. Appl. No. 14/662,021, filed Mar. 18, 2015, Gregory Michael Duncan, et al.
U.S. Appl. No. 15/153,713, filed May 12, 2016, Marthas Seeger, et al.
Texts: Online, Open-Access Textbooks, "7.1 Simple exponential smoothing," Rob J. Hyndman and George Athanasopoulos, downloaded from https://www.otexts.org/fpp/7/1 on Mar. 14, 2016, pp. 1-11.
Amazon webservices, "Amazon Machine Learning," Developer Guide, Latest Version, API Version Apr. 9, 2015, Last documentation update Mar. 21, 2016, pp. 1-143.
Benglo, et al., Google Research, Scheduled Sampling for Sequence Prediction with Recurrent Neural Networks, Sep. 23, 2015, pp. 1-9.
Sutskever, et al. "Sequence to Sequence Learning with Neural Networks," Submitted on Sep. 10, 2014 (v1), last revised Dec. 14, 2014 (this version, v3), pp. 1-9.
Ahmed, Nesreen K., et al., Publisher Taylor & Francis, "An Empirical Comparison of Machine Learning Models for Time Series Forecasting," Sep. 15, 2010, pp. 1-29.
Qingzheng xu, "A Review of Croston's method for intermittent demand forecasting," Jan. 1012, IEEE, pp. 468-472.
Nicolas Chapados, "Effective Bayesian Modeling of Groups of Related Count Time Series," Proceedings of the 31st International Conference on Machine Learning, Beijing, China, 2014. JMLR: W&CP vol. 32. Copyright 2014 by the author(s), pp. 1-9.
Research Program on Forecasting, "Forecasting the Intermittent Demand for Slow-Moving Items," Snyder, et al., Original Working Paper: May 18, 2010; Revised: Mar. 11, 2011, pp. 1-39. RPF Working Paper No. 2010-003, http://www.gwu.edu/~forcpgm/2010-003.pdf.
Christopher M. Bishop, Pattern Recognition and Machine Learning, 2002-2006, Springer 2006, First printing, pp. 1-82, More Info at http://research.microsoft.com/~cmbishop/PRML.
Valentin Flunked "DeepAR: Probabilistic Forecasting with Autoregressive Recurrent Networks", arXiv:1704.04110V2, Jul. 5, 2017, pp. 1-11.
Gregory Trubetskoy "Holt-Winters Forecasting for Dummies" Part II, Feb. 16, 2016, pp. 1-6.
Gregory Trubetskoy "Holt-Winters Forecasting for Dummies" Part III, Feb. 17, 2016, pp. 1-12.
Gregory Trubetskoy "Holt-Winters Forecasting for Dummies" Part I, Jan. 29, 2016, pp. 1-13.
Wikipedia, "Power transform", retrieved from URL https://en.wikipedia.org/wiki/power_transform, dated Jul. 23, 2018, pp. 1-7.
Marco Fraccaro et al "A Disentangled Recognition and Nonlinear Dynamics Model for Unsupervised Learning" (31st Conference on Neural Information Processing Systems) 2017, pp. 1-10.
Ruofeng Wen et al "A Multi-Horizon Quantile Recurrent Forecaster" dated Jun. 28, 2018, pp. 1-9.
Junyoung Chung et al "A Recurrent Latent Variable Model for Sequential Data" pp. 1-9.
Matthias Seegar et al "Approximate Bayesian Inference in Linear State Space Models for Intermittent Demand Forecasting at Scale" Sep. 22, 2017, pp. 1-30.
Diederik P. Kingma et al "Auto-Encoding Variational Bayes" May 1, 2014, pp. 1-14.
Matthias Seeger et al "Bayesian Intermittent Demand Forecasting for Large Inventories" (30th Conference on Neural Information Processing Systems) 2016, pp. 1-9.
Matthew James Johnson et al "Composing graphical models with neural networks for structured representations and fast inference" (30th Conference on Neural Information Processing Systems) 2016, pp. 1-9.
Rahul G. Krishnan et al "Deep Kalman Filters" Nov. 25, 2015, pp. 1-17.
G.E.P. Box et al "An Analysis of Transformations" URL:http://links.jstor.org/sici=0035-9246%281964%2926%3A2%3C211%AAAOT%E2.0.CO%B2-6, Sep. 6, 2002, pp. 1-43.
Alex Graves et al "Generating Sequences with Recurrent Neural Networks" Jun. 5, 2014, pp. 1-43.
Manzil Zaheer et al "Latent LSTM Allocation Joint Clustering and Non-Linear Dynamic Modeling of Sequential Data" pp. 1-10.
Ilya Sutskever et al "Sequence to Sequence Learning with Neural Networks" pp. 1-9.
Marco Fraccaro "Sequential Neural Models with Stochastic layers" (30th Conference on Neural Information Processing Systems), 2016, pp. 1-9.
Xun Zheng et al "State Space LSTM Models with Particle MCMC Inference" Nov. 30, 2017, pp. 1-12.
Danilo K. Rezende et al "Stochastic Backpropagation and Approximate Inference in Deep Generative Models" Dated May 30, 2014, pp. 1-14.
Rahul G. Krishnan "Structured Inference Networks for Nonlinear State Space Models" (Proceedings of the Thirty-First AAAI Conference on Artificial Intelligence) 2017, pp. 1-9.
Hsiang-Fu Yu et al "Temporal Regularized Matrix Factorization for High-dimensional Time Series Prediction" (30th Conference on Neural Information Processing Systems), 2016, pp. 1-9.

(56) References Cited

OTHER PUBLICATIONS

Nikolay Laptev et al "Time-series Extreme Event Forecasting with Neural Networks at Uber" (ICML Time Series Workshop) 2017, pp. 1-5.

Krueger, David et al, "Zoneout: Regularizing RNNs by randomly preserving hidden activations", dated Sep. 22, 2017, pp. 1-11.

Zhang, G Peter et al, "Neural network forecasting f or seasonal and trend time series", European Journal of Operational research 160.2, dated 2003, pp. 1-14.

* cited by examiner

ARTIFICIAL INTELLIGENCE SYSTEM COMBINING STATE SPACE MODELS AND NEURAL NETWORKS FOR TIME SERIES FORECASTING

BACKGROUND

For many kinds of business and scientific applications, the ability to generate accurate forecasts of future values of various measures (e.g., retail sales, or demands for various types of products or resources) based on previously collected data is a critical requirement. The previously collected data often consists of a sequence of observations called a "time series" or a "time series data set" obtained at respective points in time, with values of the same collection of one or more variables obtained for each point in time (such as the per-day sales for a particular inventory item over a number of months, which may be recorded at an Internet-based retailer).

Time series data sets are used in a variety of application domains, including for example weather forecasting, finance, econometrics, medicine, control engineering, data center resource management, astronomy and the like. The characteristics of individual time series, e.g., the trends or periodic phenomena represented in the values of a given time series, may differ based on a variety of application dependent factors. Statistical properties of some time series, e.g., time series representing demand data for products or items that may not necessarily be sold very frequently, can make it hard to generate forecasts using some conventional techniques.

Several types of machine learning models have recently been used to generate time series forecasts. For example, multi-layer or deep neural networks (DNNs) have been used to learn characteristics of time series and make predictions for future values of the time series based on the learned characteristics. However, in order to train such DNNs, large training sets are often required, e.g., comprising numerous long time series. Obtaining such extensive training data may present a non-trivial technical challenge for at least some applications. Furthermore, even in scenarios in which extensive training data is available, the amount of time and resources required for training the DNN models may represent obstacles that are hard to overcome.

Figure 1:
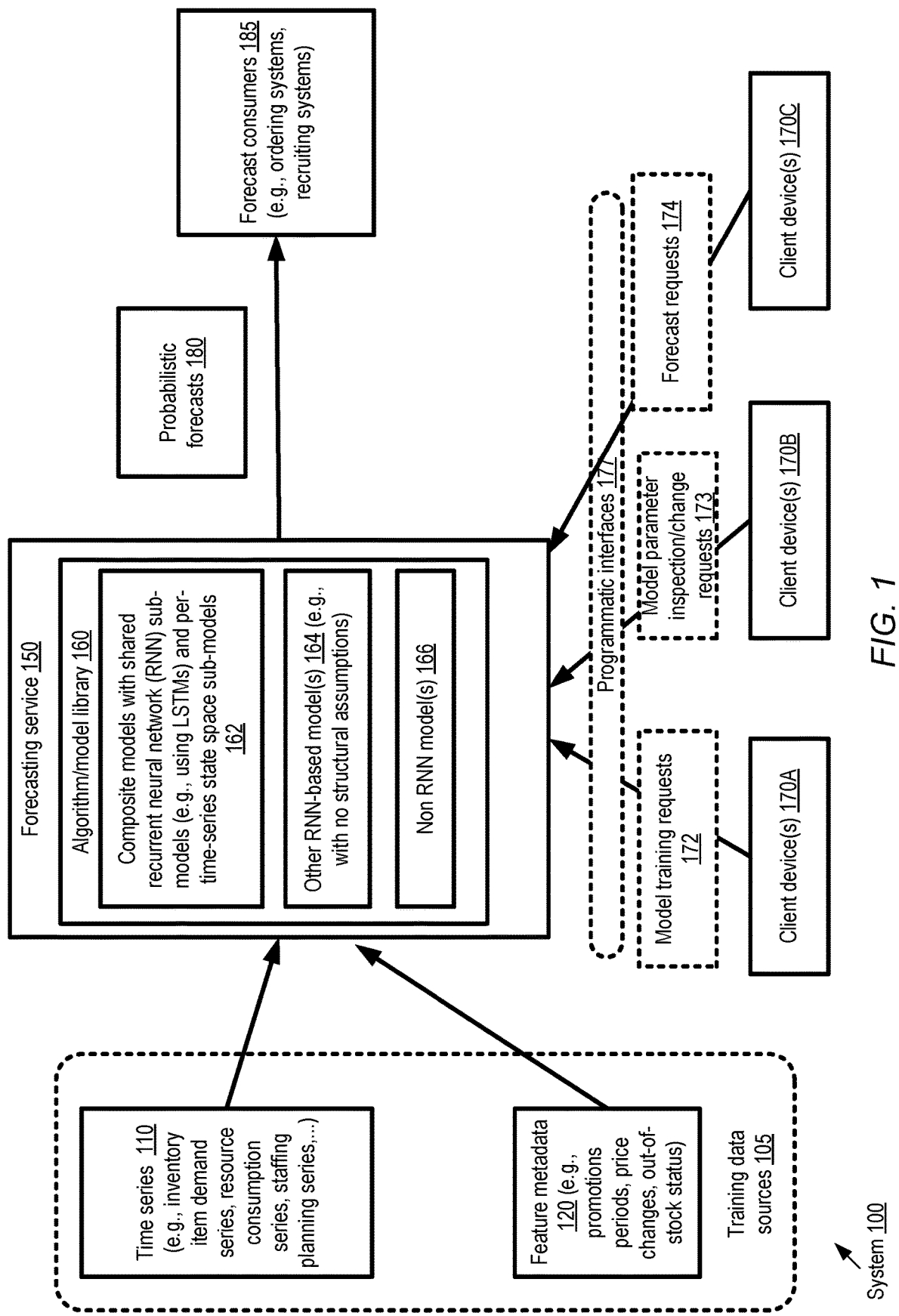
FIG. 1 illustrates an example forecasting system in which probabilistic demand forecasts may be generated for time series using composite machine learning models that include a shared neural network sub-model and per-time-series state space sub-models, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for forecasting time series values using a composite machine learning model comprising a shared recurrent neural network (RNN) based sub-model and one or more state space sub-models are described. Generally speaking, in various embodiments state space models may incorporate structural information (e.g., regarding trends, smoothness etc.) about time series that can potentially be helpful in predicting future time series values, because the structural information captures patterns, semantics or characteristics of the sequences of the values that make up the time series. In at least some embodiments, the input to the RNN sub-model of the composite model may comprise, for example, respective sets of co-variate features corresponding to a plurality of time series; as such, the RNN may jointly learn characteristics of all the different time series data sets available in such embodiments. The output of the shared RNN may be used to determine parameters of individual ones of the state space sub-models corresponding to the respective time series. Thus, for example, if the available input data comprises K time series, the composite model may comprise one shared RNN and K state space sub-models in at least some embodiments. At a high level, in various embodiments the composite model may combine the technical advantages of deep recurrent neural network models (such as the ability to extract higher-order features from multiple time series, and identify complex patterns within and across the time series) with those of state space models (which may not require very large training data sets due to the structural assumptions made about the time series data sets, such as seasonality, trends, temporal smoothness, and so on). As a result of combining state space modeling techniques with RNNs, the amount of training data and/or time needed to obtain a forecast model that satisfies a target quality criterion may be reduced substantially (e.g., relative to the use of a neural network based model that does not incorporate structural assumptions).

As one skilled in the art will appreciate in light of this disclosure, certain embodiments may be capable of achieving various advantages, including some or all of the following: (a) reducing the overall amount of CPU, memory, networking and storage resources that have to be utilized for training time series forecasting models of a desired quality level, (b) simplifying the user experience of time series forecast requesters and data scientists, e.g., by providing easy-to-understand use case templates which can be specified for forecasting requests, and/or by providing/modifying parameters of the state space sub-models on demand, (c) reducing the amount of resources (e.g., CPU, memory, storage networking, and/or other resources such as sensor resources used for capturing the raw data) that have to be dedicated to collect and save data values of various time series for inclusion in input data sets (either for training, or for post-training prediction) for forecasting models and/or (d) reducing the consumption of computation and other resources that may potentially result from inaccurate forecasts, e.g., in automated systems that utilize time series forecasts to initiate actions of various types.

According to some embodiments, a system may comprise one or more computing devices of an artificial intelligence service. The computing devices may obtain an indication of one or more time series, each of which may comprise a sequence of values corresponding to respective time steps (which may also be referred to in some embodiments as time points). In addition, in various embodiments, respective sets of descriptive metadata corresponding to individual ones of the time series may be obtained. For example, in the case of a time series representing sales amounts or demand for an item, the metadata may include the prices for the items at one or more of the time steps/points, information about promotions or sales, and the like. In the case of a time series representing fault-management related metrics collected from servers in a data center, the metadata may for example indicate the types of software/hardware subcomponents at which a fault was detected, the specific tools that led to the detection of a fault, the amount of effort needed to resolve the individual faults, and so on. Other types of domain specific metadata may be used for time series pertaining to autonomous vehicles, robotics, image/speech processing applications and the like. The metadata (either in its raw form, or in a form obtained via one or more transformation functions applied to the raw metadata) may be referred to as covariate features or covariate information in some embodiments. In some cases, respective metadata elements may be obtained for individual time steps of a given time series—that is, at least some portions of the metadata may be time-dependent in some embodiments. Other metadata elements may be time independent in various embodiments. In one embodiment, individual ones of the time series may be designated as belonging to one of a set of categories (such as the product type, e.g., "shoes", "jewelry", etc. to which an item whose demand is represented in a time series belongs), and such category information may be considered part of the metadata. In at least some embodiments, the time between successive values may differ from one time series to another, and/or the number of entries in respective time series may differ. In at least one embodiment, a given time series may not be required to be complete: e.g., if the time series comprises values collected at hourly intervals between hours H1 and H2, it may be the case that values for a few of the intervening hours are absent.

In various embodiments, as mentioned above, at least one composite forecasting model may be trained using the information available about the time series. Such a composite model may comprise a shared recurrent neural network sub-model (RNNSM) (e.g., including long short term memory units or LSTMs) and one or more state space sub-models (SSSMs) corresponding to individual ones of the one or more time series in some embodiments. A given state space sub-model may, for example, comprise a state transition formulation (e.g., one or more matrix or vector formulas) and a probabilistic value generation formulation (e.g., the portion of the state space sub-model which produces predicted values of the time series). In at least some embodiments, linear state space sub-models may be used, with a deterministic transition matrix and a random innovation term. In one embodiment, for example, a latent state representation in a linear state space sub-model may encode level, trend and/or seasonality components. The observation model (the probabilistic value generation component) of a state space sub-model may comprise a univariate Gaussian distribution in some embodiments; in other embodiments, non-Gaussian distributions may be used.

The specific content of the input provided to the RNNSM may differ in different embodiments. In at least some embodiments, for example, during training of the composite forecasting model, input to the shared RNNSM may comprise covariate feature sets representing (e.g., derived from the raw values of) the respective descriptive metadata of one or more of the time series, but may not necessarily comprise the actual values of at least some of the time series. In other embodiments, both the feature sets and the values of time series may be consumed as input by the RNNSM. In various embodiments, one or more parameters of at least one SSSM may be determined based at least in part on output of the shared RNNSM. A loss function of the composite forecasting model may be computed based at least in part on (a) a probabilistic value generated at a particular SSSM and (b) an observation value of a particular time series corresponding to the particular SSSM in some embodiments. As such, while the times series values may not necessarily be consumed directly as input by the RNNSM, the time series values may nevertheless influence the parameters of the composite model as a whole due to their influence on the loss function. In at least one embodiment, Kalman filtering may be used during training of the composite model.

After training completion criteria for the composite forecasting model are satisfied, a trained version of the composite forecasting model may be stored in various embodiments. Respective probabilistic forecasts pertaining to any of various time series, including for example some of the time series whose values were used in the training and/or new time series that were not used during the training, may be generated using the trained version of the composite model, and provided to various destinations in different embodiments.

In at least some embodiments, the model may be trained in response to a request submitted via a programmatic interface implemented by a network-accessible forecasting service or tool. Any of various types of programmatic interfaces may be employed in different embodiments, such as a web-based console, a set of application programming interfaces (APIs), command line tools and/or graphical user interfaces. In one or more programmatic interactions with the forecasting service or tool, a client or user may specify any of several hyper-parameters or meta-parameters for training and/or executing the requested model in some embodiments. For example, in some embodiments the hyper-parameters may include, among others, (a) a time frequency of one or more of the time series used for the training, (b) an indicator of a number of predictions to be generated for one or more of the time series, (c) an indicator of a number of time series time steps to be consumed as input to generate a prediction, (d) an indication of a noise model to be used for uncertainty estimates, (e) a number of training epochs, (f) a cardinality of a categorical feature associated with individual ones of the time series, (g) an embedding dimension to be used to characterize categories of time series, (h) a number of cells within a layer of a recurrent neural network used in a forecasting model, (i) a number of layers of a recurrent neural network used in a forecasting model, (j) a mini-batch size to be used during the training of the forecasting model, (k) a learning rate to be used during the training, (l) the regularization parameter(s) to be used, (m) a training completion criterion, (n) a loss metric to be computed during the training, or (o) one or more properties of the types of state space sub-models to be used (e.g., the particular combination of structural assumptions to be incorporated, one or more terms of the state transition formulation or the probabilistic value generation formulation, etc.). In at least some embodiments, a forecasting service or tool may automatically generate one or more terms of the formulations (e.g., the state transition formulation, and/or the probabilistic value generation formulation) used for a state space sub-model based at least in part on an analysis of the values and/or metadata of a time series.

In at least one embodiment, a template-oriented forecasting service may be implemented, which may provide users or clients with a set of alternative use case templates—e.g., one template may represent hourly or daily demand values for e-retail items of a particular category or catalog, another template may represent CPU consumption measurements at 5-minute intervals at a large data center of a cloud infrastructure provider, another template may represent hourly pollution sensor measurements at one or more sensor locations, and so on. Corresponding to individual ones of the templates, respective composite models comprising a shared RNNSM and one or more SSSMs may be trained at least partially in advance at the template-oriented forecasting service. Via one or more programmatic interfaces, indications of the use case templates for which trained models are available may be provided to clients of the forecasting service in some embodiments. When a client wishes to obtain a forecast with respect to a given time series, in some such embodiments the client may programmatically indicate the particular template which matches (or comes acceptably close to matching, from the client's perspective) the client's particular use case, and the service may utilize the trained or partially trained model corresponding to that template to generate the requested forecast. The use of the templates may thus simplify and speed up the tasks that have to be performed to respond to a forecasting request in various embodiments.

In contrast to some neural network based machine learning models, whose internal working is often opaque and hard to understand, in at least some embodiments considerable visibility may be provided into internal aspects of the composite forecasting model. For example, values of the learned parameters of the SSSMs may be provided, e.g., in response to programmatic requests, to a client of a forecasting service or tool in one embodiment. In at least some embodiments, a client (such as a data scientist who can suggest improvements in the model) may even submit requests to modify parameters of a state space sub-model after the composite model has been trained, and the modified parameters may be used to generate a forecast for a particular time series.

Example System Environment

FIG. 1 illustrates an example forecasting system in which probabilistic demand forecasts may be generated for time series using composite machine learning models that include a shared neural network sub-model and per-time-series state space sub-models, according to at least some embodiments. As shown, system 100 may include various resources and artifacts of a forecasting service 150 at which a number of different types of forecasting models may be trained and executed for time series data sets. An algorithm and model library 160 of the forecasting service 150 may comprise, for example, composite models 162 with a shared RNN sub-model and per-time-series state space sub-models, other RNN-based models 164 which do not use structural assumptions or state space sub-models, and so on. The state space sub-models may in effect incorporate structural assumptions regarding the time series, such as assumptions regarding trends, seasonality and the like, into the composite forecasting model in the depicted embodiment, and thereby reduce the number of time series time step values that have to be analyzed to make accurate predictions. Some forecasting models that do not include RNNs, such as models 166, may also be implemented in the depicted embodiment at the forecasting service 150. For example, non-RNN models 166 may include regression-only models, exponential smoothing models or autoregressive integrated moving average (ARIMA) models, and so on in some embodiments. The forecasting service may also be referred to as a forecaster in some embodiments. In at least one embodiment, a composite forecasting model comprising a convolutional neural network (CNN) sub-model (e.g., instead of or in addition to an RNN) and one or more per-time-series state space models may be trained and used at the forecasting service.

In the embodiment depicted in FIG. 1, the input provided to the RNN sub-model of a composite model 162 may, for example, comprise feature metadata 120 corresponding to one or more time series. In at least one embodiment, the input to the RNN sub-model may not necessarily comprise the actual values of the time series; instead, the actual time series values, as well as the output generated by the state space sub-models, may be used in computing the loss function of the composite model. Parameters of the state space sub-models may be determined using the output of the shared RNN sub-model in the depicted embodiment. After a composite model 162 has been trained, it may be stored and used to generate probabilistic forecasts 180. The composite model may be represented and stored in a variety of ways, using any combination of several different types of data structures, in different embodiments. In some embodiments, the model may be stored as one or more data structures that can be easily used by a computing device to generate forecasting output for a given set of input. For example, in some cases, a model may be represented as one or more vectors or matrices of parameter values, coefficients of linear or nonlinear functions to be applied to model inputs, and the like. The parameter values may be values that are used in the forecasting process itself, or may comprise metadata used for other purposes. For example, in some cases the model parameters may include one or more values indicating a current confidence level or bound of the model. In some cases, a model 162 may include memory units that store the ongoing state of the modeled set of time series, or values derived from other inputs or outputs. In some cases, a model 162 may be stored using a combination of more complex data structures that specify relationships between parameters, such as trees, graphs, neural networks, or the like. In some cases, the structure of the model may change over time. In some cases, a model may be embedded as part of a computer-executable program or a set of hardware circuits, which may expose configurable model parameters, and be executed to carry out forecasting functions.

In the embodiment depicted in FIG. 1, a number of data sources 105 may be employed for obtaining training data for the forecasting models. For example, depending on the application, times series data sets 110 may be obtained from a database of demand or sales records of an inventory, from automated tools that record various types of resource consumption periodically (e.g., the number of hosts at which one or more virtual machines are utilizing at least X % of the available CPUs) at a data center, from tools used to manage employees and staffing at an organization, and so on. Feature metadata 120 may include, for example, such information as inventory item product categories, prices, calendar events such as holidays which may affect demands for various items, promotion periods (e.g., time periods in which specific items were on sale for a lower-than-normal price), periods in which an inventory item was out of stock, and so on. With respect to time series pertaining to resource consumption at a data center, e.g., at a cloud computing environment, the feature metadata 120 may include, for example, specific applications for which resource usage data is captured, and so on. Generally speaking, feature metadata 120 may comprise elements of information that could potentially help explain the variation in values over time for the type of time series being considered, and it may therefore be useful to incorporate the feature metadata into the predictive models used for forecasting in at least some embodiments. In some embodiments, the raw metadata may be processed or transformed before it is provided as input to the composite model—e.g., numeric values of the metadata may be normalized, vectorized and so on, categorical values may be transformed to numeric values, and so on.

The forecasting service 150 may implement a set of one or more programmatic interfaces 177 in the depicted embodiment, such as a web-based console or web site, a set of APIs, command line tools, graphical user interfaces and the like. Such interfaces 177 may be used to submit requests from various types of client devices 170 (e.g., 170A, 170B or 170C), such as desktops, laptops, tablet computing devices, smart phones, and the like, and to receive responses to such requests in various embodiments. In some embodiments, for example, a client of the forecasting service 150 may submit a model training request 172, indicating a set of time series and associated metadata for which a forecasting model is to be generated. In response to such a model training request, instances of one or more types of forecasting model from library 160 may be developed in the depicted embodiment. The particular type of model (or models) to be generated may be indicated in the training request in some embodiments, or may be selected by the forecasting service in other embodiments (e.g., based on a preliminary analysis of the input time series and/or the associated feature metadata).

In at least some embodiments, after a forecasting model such as composite model 162 has been trained, a client of the forecasting service may submit a programmatic request 173 to inspect and/or modify one or more parameters of the model. For example, a data scientist may wish to view the parameters learned for a given state space sub-model, and in some cases modify one or more of the parameters prior to using a composite model with that state space sub-model for obtaining a probabilistic forecast 180 in the depicted embodiment.

When a forecast request 174 is submitted to the service 150 via a programmatic interface in the depicted embodiment, the appropriate trained model may be utilized to generate a probabilistic forecast 180 for the particular time series indicated in the request 174. Note that forecasts may be generated for time series that were used during training, and/or for new time series that were not used during the training in at least some embodiments. The forecasts may be described as being probabilistic in various embodiments because they may represent samples drawn from a probability distribution of predicted values for the time series with respect to various points in time. In at least some embodiments, instead of using a single model, an ensemble of models may be used to respond to a given forecast request 174—e.g., results obtained from one instance of a model 162 may be combined with results obtained from one instance of a model 164 and/or a model 166.

The results provided by the forecaster may be used to make various types of business decisions more intelligently in various embodiments—e.g., depending on the application, to generate purchase orders for appropriate quantities of items at appropriate times, to decide whether it is worthwhile to continue stocking various items or not, to plan ahead for warehouse space expansions, to plan for recruiting new employees, to plan purchases of computing equipment for a data center, and so on. Consider an example use case in which the time series 110 represent demand values for various data items of an inventory. In at least some embodiments, demand forecasts for such a use case may be provided as input to one or more forecast consumers 185, such as an automated ordering system, which may in turn transmit orders for various inventory items to meet business requirements of the organization on behalf of which the forecasts were produced. In some embodiments, the output of the forecasting service 150 may be provided to other automated entities or systems, such as a discount planning system, a facilities planning system, a promotions planning system or a product placement planning system. Using the probabilistic forecasts 180 with respect to item demand, a discount management system may, for example, make recommendations or decisions regarding if, when, for how long and by how much the price of a particular inventory item should be reduced. A facilities planning system may use the forecasts for managing warehouse space for various products. A promotions planning system may be able to recommend specific tie-ins with external factors (such as a sale of a particular set of items associated with a release of a motion picture or the staging of a sports event) using the forecasts. A product placement planning system may utilize the forecasts for helping recommend the shelf locations of various items in a physical store, or whether an item should be placed in a shopfront window, for example. In some embodiments, the forecasts may be used to anticipate side effects of future demands, such as increases or decreases in shipping costs, which may influence business contracts with mailing/delivery services and so on. In one embodiment, results provided by the forecaster may be used to, for example, automatically provision additional computing resources at a data center at which auto-scaling of network accessible services in response to changing workload levels is supported. In another embodiment, the forecasts may for example be used to cause a robotic system and/or an autonomous vehicle system, e.g., within a factory or warehouse, to relocate items from one location to another, or to reposition the robotic system or autonomous vehicle system in anticipation of one or more events. As a result of incorporating structural assumptions via state space models, the quality of the forecasts that can be obtained using a given budget of resources may be increased, since the structure information may enable more training iterations and/or epochs to be conducted than may be possible if larger training data sets were used. The improved quality of the forecasts may in turn help save substantial resources in the downstream forecast consuming systems 185 in various embodiments.

In one embodiment, the customers or clients on whose behalf the forecasting is being performed may indicate (e.g., using interfaces 177) preferences regarding the metrics to be used to rate the quality of the forecasts. For example, one client may programmatically indicate that the accuracy of the median (50th percentile) forecast for T days in the future is of greatest interest, while for another client, the accuracy of the $90^{th}$ percentile forecast for 2*T days of the future may be more important. Based on the input provided programmatically by the clients, the models being used may be evaluated at the forecasting service in various embodiments. If the evaluations indicate that the model does not meet a desired quality/accuracy criterion, the model may be adjusted in some embodiments—e.g., various hyper-parameters, initial parameters and/or feature extraction techniques may be modified and the model may be retrained. In at least one embodiment, new versions of the models may be generated over time as new time series observations are obtained. For example, in one scenario, new demand forecasts for K weeks into the future may be generated every week using demand data collected over a time window of the previous N weeks as input for the forecasting methodology.

Decomposition of Example Time Series

Figure 2:
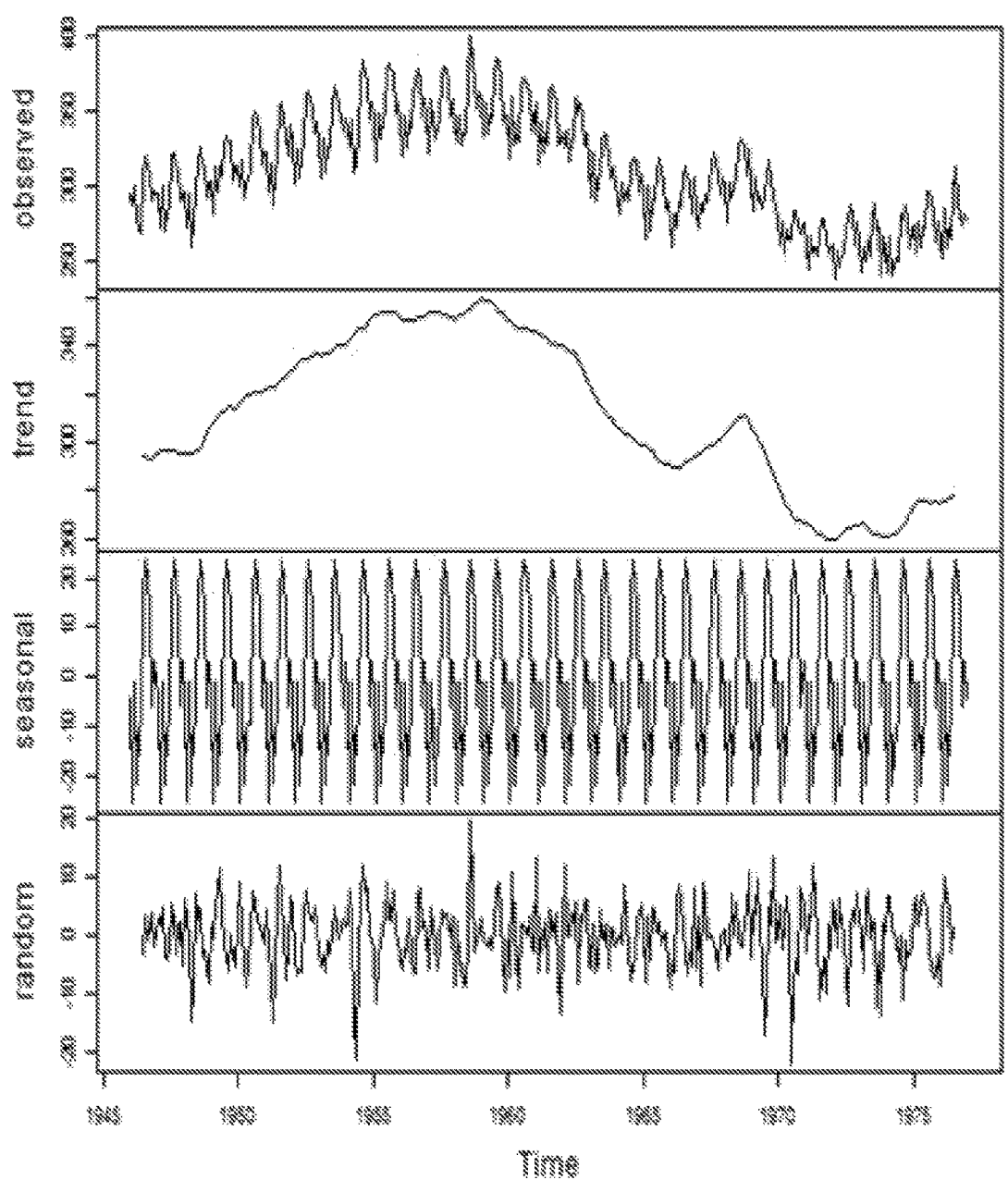
FIG. 2 illustrates an example time series whose values may be decomposed into random, trend, and seasonal components which may be represented using a state space modeling methodology, according to at least some embodiments.

As mentioned above, state space sub-models employed in at least some embodiments as part of a composite forecasting model may incorporate various types of structural assumptions regarding the sequences of values of a time series. To motivate such an approach, examining the manner in which the values of an example time series may potentially be deconstructed or decomposed may be helpful. FIG. 2 illustrates an example time series whose values may be decomposed into random error, trend, and seasonal components, according to at least some embodiments. The data points plotted in the "observed" portion at the top of FIG. 2 represent the number of live births (in thousands) recorded in each successive month in the United States from 1948 to 1979. The raw data was obtained from the "birth" subcomponent of the Applied Statistical Time Series Analysis ("astsa") package of a version of the R statistical computing environment.

As is evident from the "observed" portion of FIG. 2, the displayed time series sequence exhibits a number of temporal patterns. For example, there seems to be some amount of seasonal variation (not too different from year to year), with a peak in the summer months and a trough in the winter months. The random fluctuations in the data appear to be roughly equal in size over the time range. As a result, an additive model may, at least in principle, be used to describe the data. In an additive model, the observed time series is assumed to be the sum of a plurality of independent components around some average or "level," such as (in the example shown in FIG. 2) a trend component, a seasonal component, and a random or irregular component. In contrast, if the amplitude of the seasonal variations and/or random fluctuations change substantially over time, a multiplicative model may be used (in which the observed values are assumed to be the product of the components rather than the sum), or the time series data may be transformed (e.g., using logarithms) to conform to an additive modeling methodology.

The lower three curves shown in FIG. 2, labeled "trend", "seasonal" and "random" represent respective estimates for the three subcomponents obtained using the "decompose( )" function in R, under the assumption that the time series was suitable for an additive model. Plotting the estimates of the components separately as in FIG. 2 may be helpful in developing overall intuitions about the variations in the data over time, and motivating the inclusion of level, trend and/or seasonal structural assumptions into state space sub-models of composite forecasting models of the kinds discussed herein.

Example Mathematical Framework

The general forecasting problem for time series may be represented as follows. For various embodiments An index i (with values in the range 1, . . . , N) may be used to refer to individual time series of a set of time series available for training a forecasting model or models in various embodiments. In one scenario where the different time series represent demand values for respective items of an inventory, for example, i may represent an item identifier. The notation $\{z_{i,1:Ti}\}$, for i=1 to N, where $z_{i,1:Ti}=(z_{i,1}, z_{i,2}, \ldots, z_{i,Ti})$ may be used to refer to the available values of the time series, where $z_{i,t} \in \mathbb{R}$ denotes the value of the $i^{th}$ time series at the $t^{th}$ time step. For any given i, the time series $z_{i,1:Ti}$ may be referred to as the target time series, and the time step range $\{1, 2, \ldots, T_i\}$ for which values are available for use in model training may be referred to as the training range. In addition to the time series values $z_{i,1:Ti}$, a set of associated, potentially time-varying covariate vectors $\{x_{i,1:Ti+\tau}\}$ is also assumed to be available. The goal of a forecasting model is assumed to be to produce a set of probabilistic forecasts, e.g., for each time series index i, we are interested in the probability distribution p of future trajectories $z_{i,Ti+1:Ti+\tau}$ over a subsequent range of time steps given the known past values:

$$p(z_{i,Ti+1:Ti+\tau}|z_{i,Ti\times 1,Ti+\tau};\Phi) \qquad \text{Formulation (1):}$$

In Formulation (1), $\Phi$ denotes a set of learnable parameters of the forecasting model, which may be shared between and learned jointly from all N time series. After the training range, the subsequent range of time steps, $\{T_i+1, T_i+2, \ldots, T_i+\tau\}$, for which probabilistic forecasts are to be generated may be referred to as a prediction range. The time step $T_i+1$ may be referred to as the forecast start time, and $\tau$ may be referred to as the forecast horizon. Note that the covariate values $x_{i,t}$ are also assumed to be available in the prediction range. The time series may be assumed to be independent of each other when conditioned on the associated covariates $x_{i,Ti}$ and the parameters $\Phi$. In contrast to some alternative approaches, in various embodiments the parameters $\Phi$ may be shared between, and learned jointly from, a plurality of available time series.

In state space models, the temporal structure of the data may be modeled via a latent state $l_t \in \mathbb{R}^L$ that may, for example, be used to encode time series components such as level, trend and seasonality patterns. Respective state space sub-models may be used in the composite model for individual ones of the time series, so the subscript i may be dropped in some portions of the following discussion which pertain specifically to the state space methodology. A general state space model for a given time series may be described by a state transition equation or formulation defining the stochastic transition dynamics $p(l_t|l_{t-1})$ by which the latent state evolves over time, and an observation model specifying the conditional probability $p(z_t|l_t)$ of the values of the time series given the latent state. In at least some embodiments, linear state space models may be used as sub-models of a composite model which includes a shared RNN sub-model. In such a linear state space sub-model, the state transition equation may take the form:

$$l_t = F_t l_{t-1} + g_t \varepsilon_t, \varepsilon_t \sim N(0,1) \quad \text{Equation (1):}$$

In Equation (1), at time step t, the latent state $l_{t-1}$ may maintain information about structural patterns such as level, trend and seasonality, and may evolve by way of a deterministic transition matrix $F_t$ and a random innovation $g_t \varepsilon_t$. The structure of the transition matrix $F_t$ and innovation strength $g_t$ may determine which kind of time series patterns are encoded by the latent state $l_t$ in various embodiments.

The probabilistic observation model may describe how time series values or observations are generated from the latent state. In the case of a univariate Gaussian observation model, for example, the values $z_t$ may be generated using the following formulation:

$$z_t = y_t + \sigma_t \epsilon_t, \; y_t = a_t^T l_{t-1} + b_t, \; \epsilon_t \sim N(0,1) \quad \text{Equation (2):}$$

In Equation (2), $a_t \in \mathbb{R}^L$, $\sigma_t \in \mathbb{R}_{>0}$, and $b_t \in \mathbb{R}$ may represent additional time-varying parameters. The initial state $l_0$ may be assumed to follow an isotropic Gaussian distribution $l_0 \sim N(\mu_0, \text{diag}(\sigma_0^2))$. A state space model or sub-model may be specified by parameters $\Theta_t = (\mu_0, \sigma_0, F_t, g_t, a_t, b_t, \sigma_t) \forall t>0$. In some traditional approaches, the dynamics may be assumed to be time-invariant, that is, $\Theta_t = \Theta \forall t>0$. One generic way of estimating the parameters, used in some embodiments, may comprise maximizing the marginal likelihood, e.g., as shown in Equation (3):

$$\Theta^*_{1:T} = \text{argmax } \Theta_{1:T} p_{SS}(z_{1:T}|\Theta_{1:T}), \quad \text{Equation (3):}$$

In Equation (3), the marginal probability $p_{SS}(z_{1:T}|\Theta_{1:T})$ of the observations $z_{1:T}$ given the parameters $\Theta$ under the state space model, integrating out the latent state $l_t$ is defined as per Equation (4):

$$p_{ss}(z_{1:T}|\Theta_{1:T}) := p(z_1|\Theta_1) \prod_{t=2}^{T} p(z_t|z_{1:t-1}, \Theta_{1:t}) = \quad \text{Equation (4)}$$

$$\int p(l_0) \left[ \prod_{t=1}^{T} p(z_t|l_t) p(z_t|l_t) p(l_t|l_{t-1}) \right] dl_{0:T}$$

In the linear Gaussian case considered here, the required integrals are analytically tractable. Note that in some traditional approaches, if there is more than one time series, a separate set of parameters $\Theta_i$ may have to be learned for each time series independently. This has the disadvantage that no information is shared across time series, making it challenging, for example, to apply such approaches to time series with limited historical data or high noise levels. Instead of learning the state space parameters $\Theta_i$ independently for each time series, a composite forecasting model employed in at least some embodiments may learn a globally shared mapping from the covariate vectors $x_{i,1:Ti}$ (associated with individual ones of the target time series $z_{i,1:Ti}$) to the (time-varying) parameters $\Theta_{i,t}$ of a state space sub-model for the $i^{th}$ time series. Such a mapping, indicated in Equation (5), may be a function of the entire covariate information $x_{i,1:Ti}$ for time steps up to and including the time-step t, as well as a shared set of parameters $\Phi$.

$$\Theta_{i,t} = \Psi(x_{i,1:t}, \Phi), \; i=1, \ldots, N, \; t=1, \ldots, T_i + \tau \quad \text{Equation (5):}$$

Given the features $x_{i,1:t}$ and the parameters $\Phi$, the data $z_{i,1:Ti}$ may be distributed according to:

$$p(z_{i,1:Ti}|x_{i,1:Ti}, \Phi) = p_{ss}(z_{i,1:Ti}|\Theta_{i,1:Ti}), \; i=1, \ldots, N \quad \text{Equation (6):}$$

In Equation (6), $p_{SS}$ denotes the marginal likelihood under a linear state space sub-model as defined in Equation (4) given (time-varying) parameters $\Theta_{i,t}$. In various embodiments, the mapping $\Psi$ from the covariate features to the state space model parameters may be generated using a deep recurrent neural network, as discussed in further detail below in the context of FIG. 3 and FIG. 4. It is noted that different mathematical formulations that those indicated above may be employed in some embodiments—e.g., non-Gaussian observation models may be used, and/or non-linear state space sub-models may be used in some embodiments.

By way of example, it may be helpful to introduce two concreate instantiations of state space sub-models. The first example comprises a simple level-trend (LT) model. In the LT model, the latent state $l_t \in \mathbb{R}^2$ has two dimensions, one for representing the level and the other for the slope of the (linear) trend. The LT model may be represented as follows:

$$a_t = \begin{bmatrix} 1 \\ 1 \end{bmatrix}, \; F_t = \begin{bmatrix} 1 & 1 \\ 0 & 1 \end{bmatrix}, \; g_t = \begin{bmatrix} \alpha_t \\ \beta_t \end{bmatrix} \quad \text{Formulation (2)}$$

In Formulation (2), innovation strengths $\alpha_t > 0$ (for the level) and $\beta_t > 0$ (for the slope), and both the level and slope components evolve over time by adding innovations $\alpha_t \epsilon_t$ and $\beta_t \epsilon_t$. The level at time step t is the sum of the level at time step t−1 and slope at t−1 (linear prediction). The initial state space prior $P(l_0)$ is given by $l_0 \sim N(\mu_0, \text{diag}(\sigma_0^2))$. The state space parameters $\alpha_t > 0$, $\beta_t > 0$, $\mu_0 > 0$, $\sigma_0 > 0$ are learned, as well as the external contribution $b_t \in \mathbb{R}$ and the observation noise $\sigma_t > 0$. Thus, for the LT model, we have $\Theta_{i,t} = (\alpha_{i,t}, \beta_{i,t}, \mu_{i,0}, \sigma_{i,0}, b_{i,t}, \sigma_{i,t})$, $t=1, \ldots, T_i+\tau$. Note that while these parameters vary for different time series, they may all be obtained with the help of the common $\Phi$ parameters of the shared RNN sub-model in at least sine embodiments.

In the case of a seasonality-based model, individual ones of the seasonality patterns may be described by a set of associated seasonal factors (or seasons). For example, in a day-of-the-week pattern, seven factors may be considered, one for each day of the week. Each such factor may be represented as a component of the latent state $l_t \in \mathbb{R}^7$. The, for a day-of-the-week seasonality model, we have:

$$a_t = 1_{\{day(t)=j\}_{j=1}^{7}}, \; F_t = I, \; g_t = \gamma_t a_t \quad \text{Formulation (3)}$$

In Formulation (3), I is the identity matrix and $\alpha_t$ is an indicator vector specifying when a factor is used. The parameters to be learned in this example scenario comprise $\Theta_{i,t}=(\gamma_{i,t}, \mu_{i,0}, \sigma_{i,0}, b_{i,t}, \sigma_{i,t})$, t=1, . . . , $T_i+\tau$.

Overview of Composite Model

Figure 3:
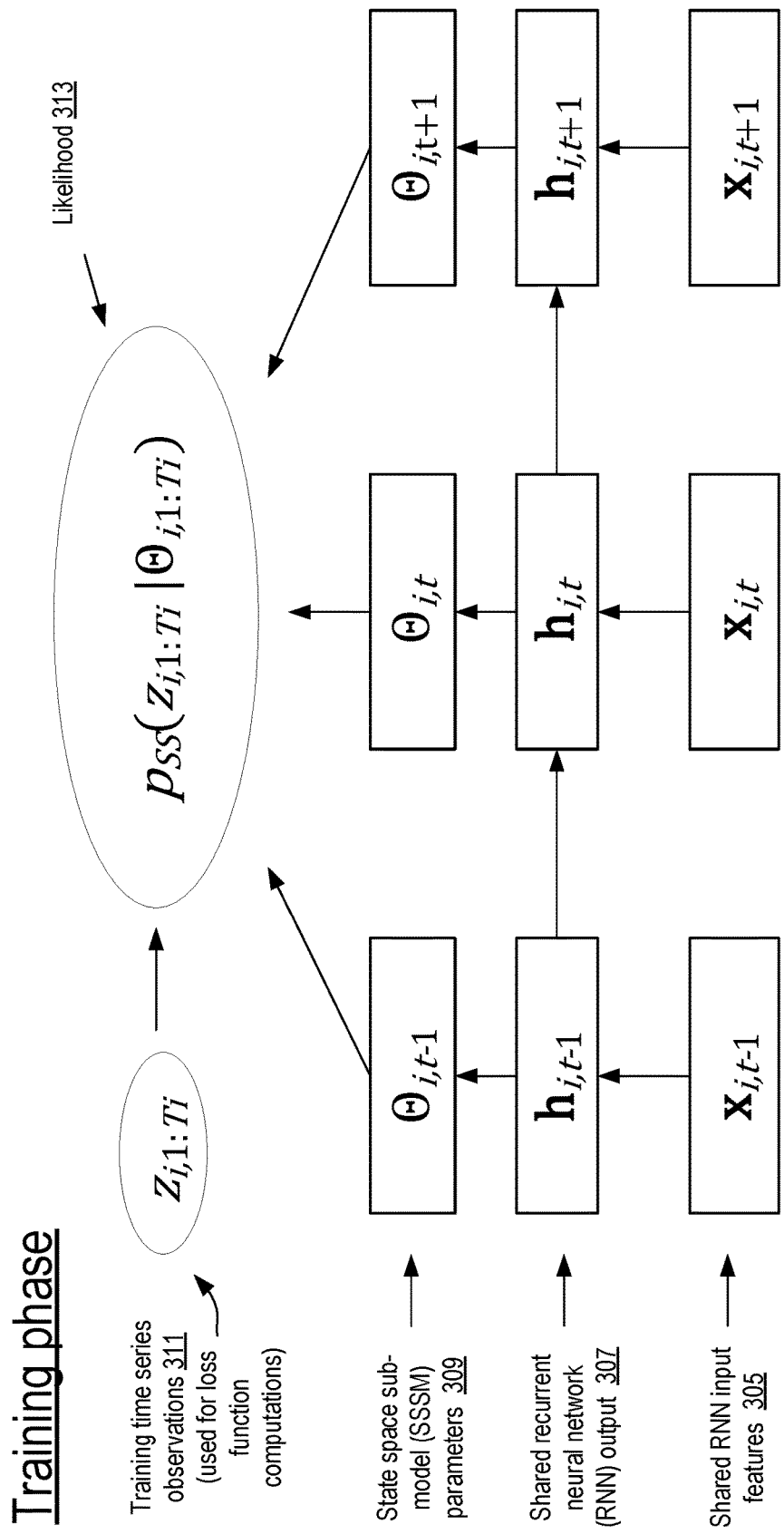
FIG. 3 illustrates example aspects of a training phase of a forecasting model which includes a shared recurrent neural network sub-model and per-time-series state space sub-models, according to at least some embodiments.

FIG. 3 illustrates example aspects of a training phase of a forecasting model which includes a shared recurrent neural network sub-model and per-time-series state space sub-models, according to at least some embodiments. In FIG. 3, the RNN sub-model is shown unrolled for three consecutive time steps. Given the covariate features $x_{i,t}$ associated with time series $z_{i,t}$, a multi-layer recurrent neural network (e.g., with some number of long short term memory or LSTM cells) and parameters $\Phi$ may compute a representation of the features via a recurrent function h: $h_{i,t}=h(h_{i,t-1}, x_{i,t}, \Phi)$. As shown, the covariate features may be consumed as input 305 in the depicted embodiment, and the output 307 (the h representation) of the shared RNN may be used to determine the state space sub-model (SSSM) parameters 309. The observations $z_{i,t}$ 311 of the time series may be used in computing the likelihood 313 and/or the loss function in the depicted embodiment, and may not be consumed as input by the shared RNN sub-model. As mentioned earlier, in at least some embodiments, the time series observations may also be consumed as input by the shared RNN sub-model.

In various embodiments, a real-valued vector of the last layer (e.g., comprising LSTMs) of the RNN sub-model may be mapped to the parameters $\Theta_{i,t}$ of the state space sub-model for the $i^{th}$ time series by applying affine mappings followed by suitable elementwise transformations constraining the parameters to appropriate ranges. The parameters of the state space sub-models may then be used to compute the likelihood 313 of the given observations $z_{i,t}$, which in turn may be used for learning the RNN parameters $\Phi$ using the loss function. In at least some embodiments, the state space sub-model parameters may be constrained using the following approach. The output of the RNN sub-model at time step t is denoted as $o_t \in \mathbb{R}^H$. For any state space sub-model parameter $\theta_t$, an affine transformation $\theta'_t=w_\theta^T o_t + b_\theta$ may be computed with separate weights $w_\theta \in \mathbb{R}^H$ and biases $b_\theta$ for each parameter $\theta$. All of these weights and biases may be included in $\Phi$ and learned in some embodiments. $\theta'_t$ may then be transformed in at least one embodiment to the domain of the parameter by applying, for example, the following transformations: (a) for real-valued parameters such as $b_t$, no transformation may be required; (b) for positive parameters, the softplus function $\theta_t=\log(1+\exp(\theta'_t))$ may be used; and/or (c) for bounded parameters $\theta \in [p, q]$, a scaled and shifted sigmoid $\theta_t=((q-p)/(1+\exp(-\theta'_t)))+p$ may be employed. In practice, in some embodiments stricter bounds than those theoretically required may be imposed; for example, imposing an upper bound on the observation noise variance or a lower bound on the innovation strengths may help to stabilize the training of the composite model in the presence of outliers.

The model parameters $\Phi$ may be learned in various embodiments by maximizing the probability of observing the time series data in the training range, e.g., by maximizing the log-likelihood $\Phi^*=\text{argmax}_\Phi L(\Phi)$, where $$L(\Phi)=\Sigma_{i=1,N} \log p(z_{i,1:Ti}|x_{i,t},\Phi)=\Sigma_{i=1,N} \log p_{SS}(z_{i,1:Ti}|\Theta_{1:Ti}) \quad \text{Equation (7):}$$

In Equation (7), individual ones of the summands of $L(\Phi)$ may be viewed as a negative loss function that measures compatibility between (a) the state space sub-model parameters $\Theta_{1:Ti}$ produced by the RNN sub-model when given input $x_{i,t}$ and (b) the true observations $z_{i,1:Ti}$. Each of these terms may represent a standard likelihood computation under a linear Gaussian state space model, which may be carried out efficiently using a variety of techniques. At least in some embodiments, for example, the log-likelihood of the observations may be decomposed into factors that may then be computed using Kalman filtering. Filtering here may refer to finding the distribution $p(l_{i,t-1}|z_{i,1:t})$, t=1 . . . , $T_i$ of the latent state given all the observations up to the current time step. In at least some embodiments, these filtered distributions may be Gaussians $p(l_{i,t-1}|z_{i,1:t}) \sim \mathcal{N}(l_{i,t-1}|f_{i,t}, S_{i,t})$. The mean and covariance of these filtered distributions may be found using Kalman filtering. As the observations at each time step may be scalars in at least some embodiments, the updates in the Kalman filtering algorithms may involve mainly matrix-matrix and matrix-vector multiplications in such embodiments. After the filtered distributions are obtained, the likelihood factors for various observations may be computed in such embodiments for the various values of t.

Figure 4:
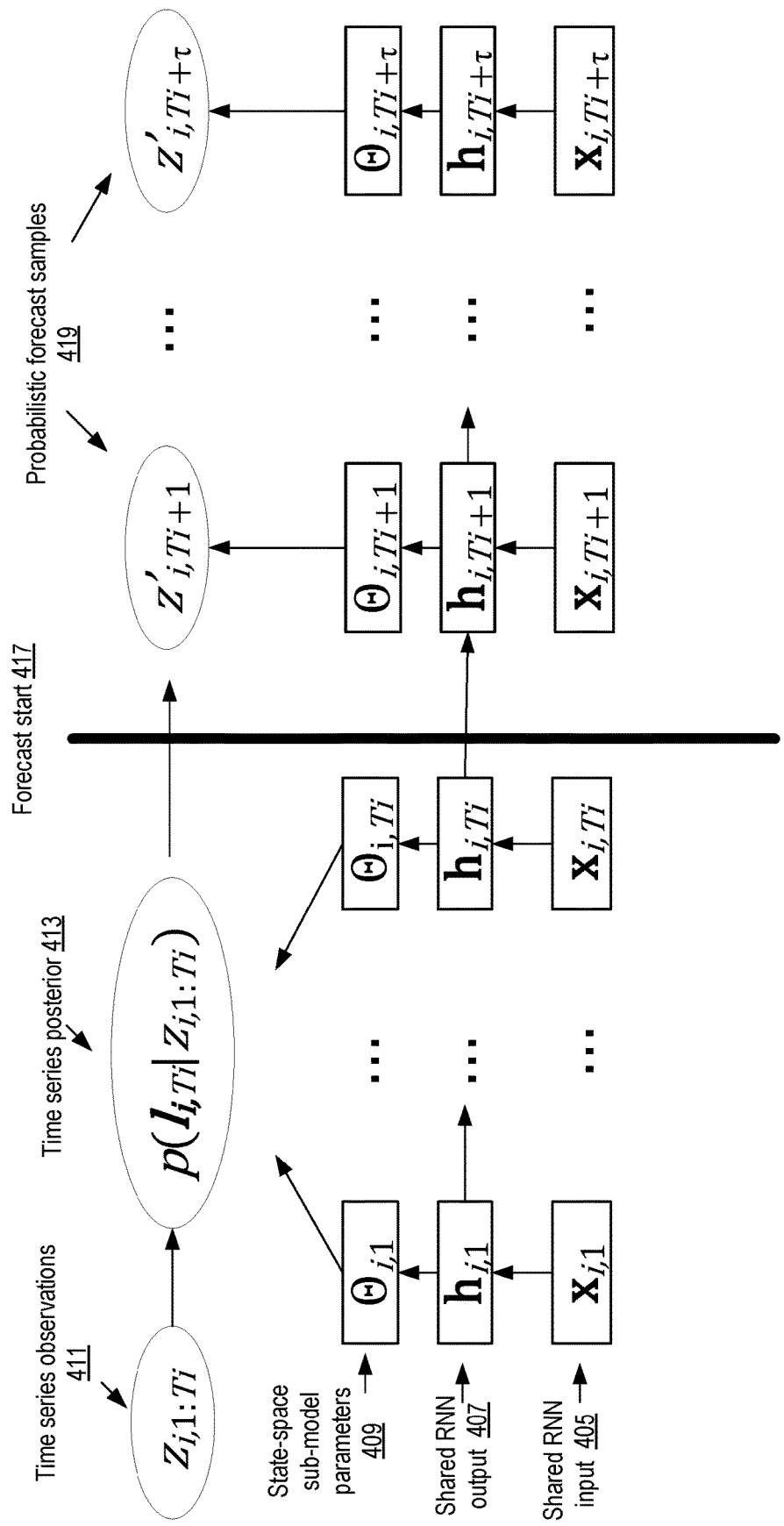
FIG. 4 illustrates example aspects of a prediction phase of a forecasting model which includes a shared recurrent neural network sub-model and per-time-series state space sub-models, according to at least some embodiments.

FIG. 4 illustrates example aspects of a prediction phase of a forecasting model which includes a shared recurrent neural network sub-model and per-time-series state space sub-models, according to at least some embodiments. Once the parameters $\Phi$ of the RNN sub-model have been learned, they may be used to generate probabilistic forecasts for individual time series. In at least some embodiments, prediction samples may be generated from the state space sub-model corresponding to a given time series. First, for example, the posterior of the latent state $p(l_T|z_{1:T})$ for the last time step Tin the training range (to the left of the forecast start boundary 417 in FIG. 4) for a given time series may be computed in such embodiments, and then the state transition formulation and the observation model (the probabilistic value generation formulation) may be applied recursively to generate the prediction samples. The inputs 405 to the shared RNN sub-model for the training range may comprise the covariate features in the depicted embodiment as discussed earlier in the context of FIG. 3, and the output 407 of the shared RNN sub-model may be used to compute the state space sub-model parameters 409, with the time series observations 411 being used in loss function computations as before.

In some embodiments, starting with a sample $l_T \sim p(l_T|z_{1:T})$, the following computations may be performed recursively to obtain the probabilistic forecast samples 419:

$$y_{T+t} = a_{T-t}^T l_{T+t-1} + b_{T+t}, \qquad t = 1, \ldots, \tau \qquad \text{Formulation (4)}$$
$$z'_{T+t} = y_{T-t} + \sigma_t \epsilon_{T+t}, \qquad \epsilon_t \sim \mathcal{N}(0, 1), \quad t = 1, \ldots, \tau$$
$$l_{T+t} \sim F_{T-t} l_{T+t-1} + g_{T+t} \epsilon_{T+t}, \quad \varepsilon_t \sim \mathcal{N}(0, 1), \quad t = 1, \ldots, \tau-1$$

The posterior $p(l_{i,Ti}|z_{1:Ti})$ 413 for individual ones of the time series may be computed in various embodiments by unrolling the RNN sub-model in the training range (t<=T) to obtain $\Theta_{i,1:Ti}$, as shown in FIG. 4, and then using Kalman filtering. Next, the RNN sub-model may be unrolled for the prediction range t=$T_i$+1, . . . , $T_i+\tau$ to obtain $\Theta_{i,Ti+1:Ti+\tau}$, and the predicted values may be obtained recursively by applying Formulation (4) K times. After the parameters $\Theta_{i,Ti+1:Ti+\tau}$ have been obtained, in some embodiments the samples may be drawn in parallel, e.g., using respective sets of computing devices/servers for the different samples.

According to at least some embodiments, e.g., in order to deal with input time series that deviate from Gaussian distribution assumptions, Box-Cox transformations (or a similar power transformation technique) may be used in a version of a composite forecasting model similar to that introduced above. In one such embodiment, the input time series (observations) may be transformed to more Gaussian-like data via Box-Cox transformation. During training, parameters of the Box-Cox transformation may also be learned by the shared RNN model, jointly with other parameters of the model. Before providing a response to a forecast request, probabilistic prediction values generated by the trained version of the composite model may be transformed back to the domain of the untransformed input data by applying the inverse Box-Cox transformation in such embodiments.

Example Probabilistic Forecast

Figure 5:
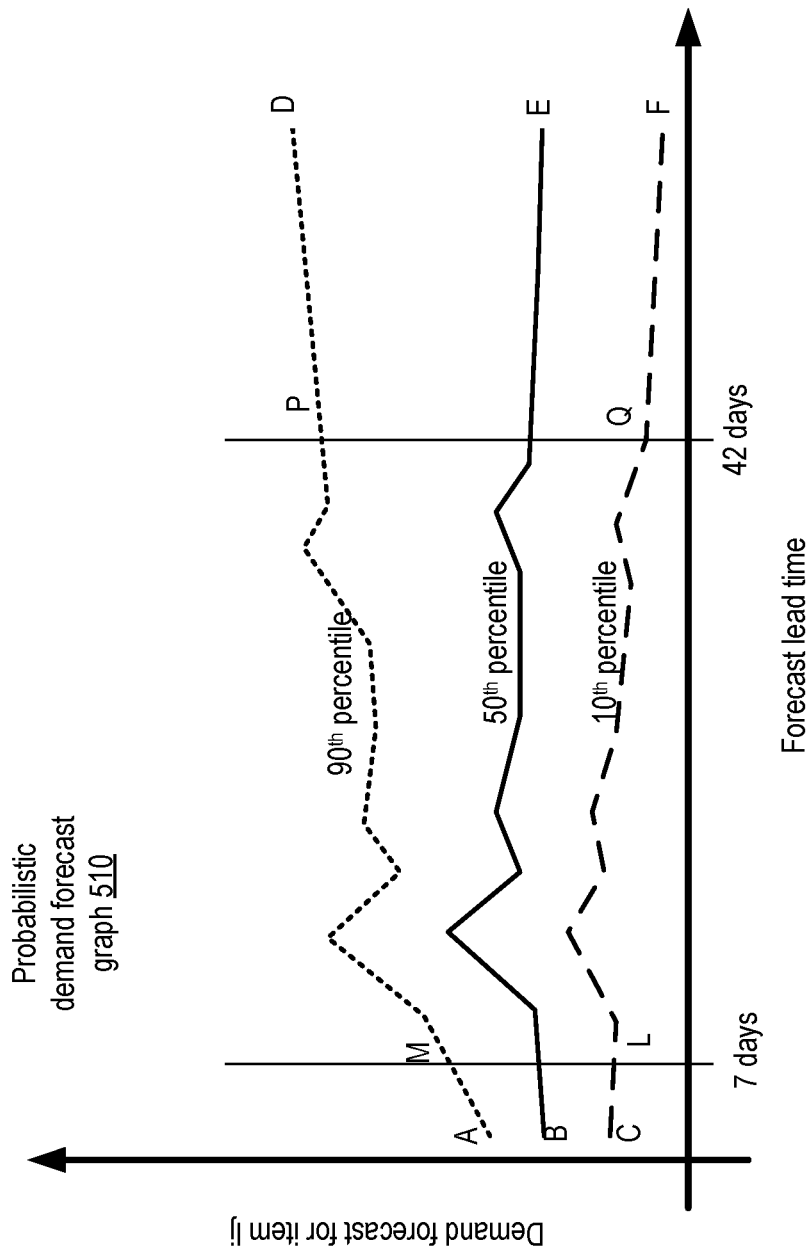
FIG. 5 illustrates an example of a probabilistic forecast graph which may be produced by a forecasting service, according to at least some embodiments.

FIG. 5 illustrates an example of a probabilistic forecast graph which may be produced by a forecasting service, according to at least some embodiments. In the depicted embodiment, forecast lead time (i.e., the difference between the time for which the forecast is to apply, and the time when the forecast is predicted) increases from left to right on the X-axis of graph 510, and the lead time is expressed in days. By way of example, the predicted demand for a particular item Ij of an inventory is represented along the Y-axis. Similar forecasts may of course be generated for other types of time series, such as resource consumption time series and the like in various embodiments.

The demand curves AMPD, BE, and CLQF correspond respectively to a $90^{th}$ percentile confidence level, a $50^{th}$ percentile confidence level, and a $10^{th}$ percentile confidence level with regard to the demand for the item. Multiple (e.g., hundreds or thousands) of executions of a composite model of the kind discussed above may be performed relatively quickly in some implementations, each resulting in a different demand curve over the prediction interval due to the use of sampling-based techniques discussed earlier. As mentioned earlier, once the parameters of the model have been determined, the samples may be drawn in parallel, thereby speeding up the process of generating the overall probabilistic forecast in various embodiments considerably. The respective curves corresponding to the individual executions may be analyzed and aggregated to obtain a probabilistic result similar to that shown in FIG. 5. In at least some embodiments, a programmatic interface (e.g., a web-based console or a graphical user interface) may be used to display probabilistic demand graphs such as graph 510. In at least one embodiment, category-level probabilistic forecasts, or probabilistic forecasts for groups of items rather than individual items, may be provided by the forecasting service.

As indicated by the relative widening of the gap between the $10^{th}$-percentile and $90^{th}$-percentile curves as the lead time increases, the uncertainty of the forecast produced using the approaches discussed above may increase as time periods further in the future are considered. For example, 7 days in the future, the gap between the $90^{th}$ percentile and the $10^{th}$ percentile corresponds to the length of segment ML, while 42 days in the future, the gap corresponds to the longer segment PQ. In some embodiments, forecast service customers may be able to programmatically indicate the particular confidence levels for which they wish to view forecasts.

Example Programmatic Interactions

Figure 6:
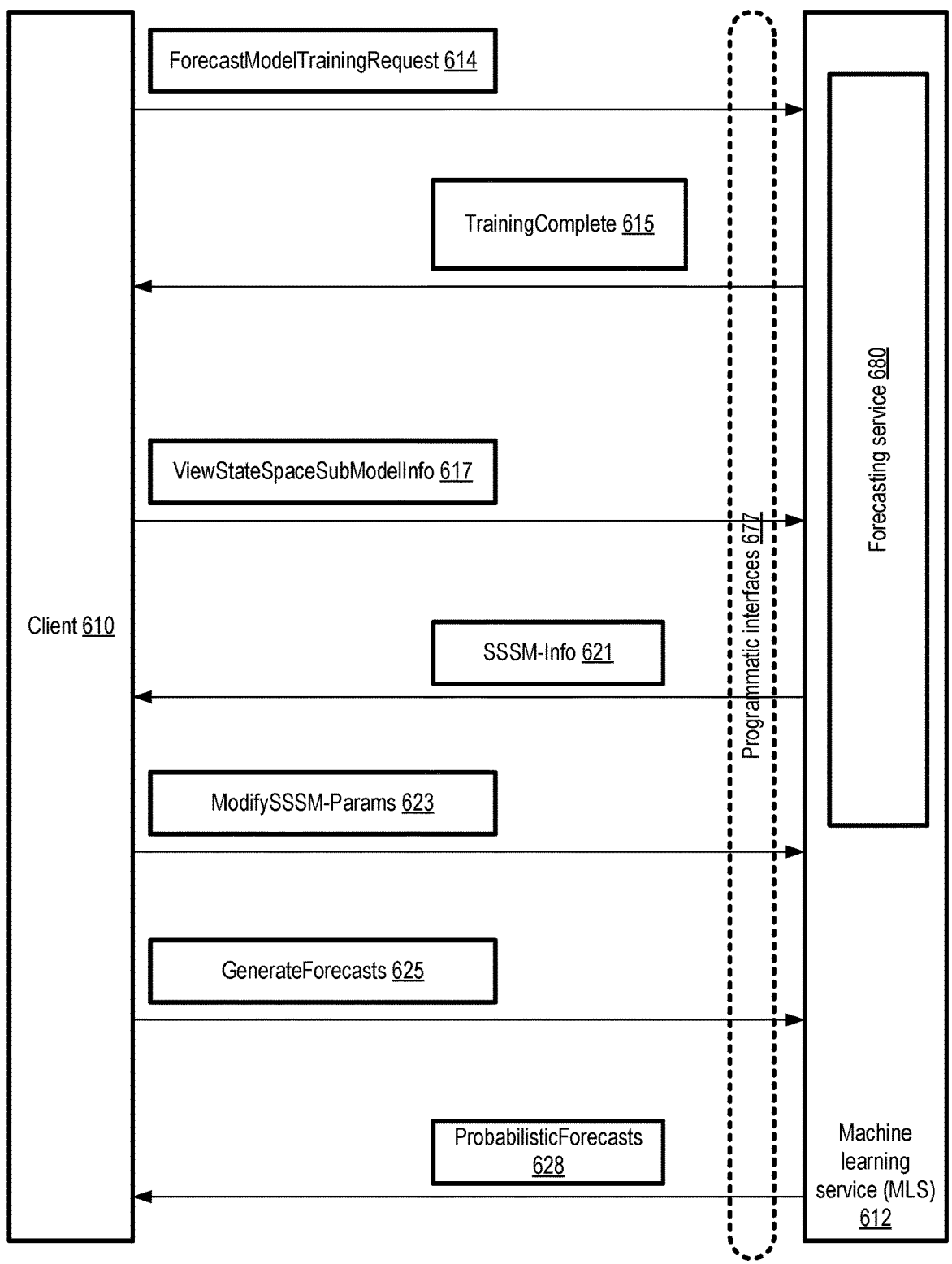
FIG. 6 illustrates example programmatic interactions between a client and a forecasting service, according to at least some embodiments.

As indicated earlier, in the context of FIG. 1, in at least some embodiments a network-accessible forecasting service or tool may implement a set of programmatic interfaces which may be used, for example, by clients to submit requests of various types and receive corresponding responses. FIG. 6 illustrates example programmatic interactions between a client and a forecasting service, according to at least some embodiments. Programmatic interfaces 677 implemented by a forecasting service 680 in the depicted embodiment may comprise, for example, a set of application programming interfaces (APIs), a web-based console, command line tools and/or graphical user interface. As shown, in some embodiments, the forecasting service 680 may be implemented as part of a more general machine learning service 612.

Using interfaces 677, a client 610 may submit a forecast model training request 614 in the depicted embodiment. Example elements which may be included in such a training request in various embodiments, such as an indication of the input time series data sets and associated metadata or features, are discussed below in the context of FIG. 8. In response to the training request, the forecasting service may select a set of training resources and train one or more forecasting models, e.g., including a composite model of the kind discussed earlier, comprising a shared RNN sub-model and a set of per-time-series state space sub-models in the depicted embodiment. When the training completion criteria are satisfied, a training complete message 615 may be provided to the client 610 in the depicted embodiment.

As mentioned earlier, one of the technical advantages of using the state space sub-models in the composite model is that more visibility may be provided into the internal working of the forecasting model. For example, in at least some embodiments a client 610 may submit a programmatic request 617 to view information such as the learned parameters of one or more of the state space sub-models, at the end of the training or even before training is complete. In response, the requested parameters may be provided via the programmatic interfaces 677, e.g., in the form of a state space sub-model (SSSM) information message. The values of the learned parameters may enable at least some clients to determine the kinds of patterns that have been learned regarding level, trend, seasonality and/or other structural characteristics of the time series during training in the depicted embodiment.

In at least some embodiments, after viewing/examining the learned parameters of the SSSMs, a client may be permitted to modify at least some parameters of one or more of the SSSMs, e.g., prior to using such SSSMs to generate post-training forecasts. Such modifications may be made, for example, if experienced clients such as data scientists are able to detect that some parameter settings can be improved relative to those that were automatically learned during training. Such potential improvements may be identified, for example, based on the clients' previous experience with state space models and/or a knowledge base regarding state space models. A request 623 to modify SSSM parameters may be submitted by a client in such embodiments if desired, and the corresponding changes may be made at the forecasting service for at least a version of the composite forecasting model that is to be used for the client. Note that at least in some embodiments, the forecasting service 680 may use such changed parameters only for forecasts requested by the client that requested the modifications; that is, the changes may not necessarily be made permanent/persistent, and the original values of the learned parameters may be retained for use in responding to other forecast requests. In other embodiments, depending for example on the permissions granted to a client, the client's requested parameter modifications may be made persistent and may be used for more than one forecast request.

In the depicted embodiment, a client 610 may submit a forecast generation request 625 via a programmatic interface 677, indicating for example one or more time series, corresponding covariate features, and future time step range(s) for which probabilistic forecasts are desired. In response, a trained version of a composite forecasting model of the kind discussed above may be executed to generate probabilistic forecasts 628 for the time series. Examples of other elements which may be included in some embodiments in the forecast requests 625 are provided below in the context of FIG. 9.

Use Case Templates for Forecasting

In at least some embodiments, for example to further streamline or simplify the user experience of clients of a forecasting service or tool, a methodology in which clients may select templates corresponding to their use cases when requesting forecasts may be employed. In effect, the accumulated experience of the forecasting service or tool in training and using forecasting models for different types of problems may be distilled into a set of templates and associated pre-trained or partially-trained composite forecasting models similar to those discussed earlier, with each template representing a common class of forecasting problems, and clients may indicate the specific templates which come closest (or are close enough from the clients' perspective) to their own specific problems. The service or tool may then employ the corresponding models, potentially saving resources that may have otherwise been needed to train forecasting models from scratch for individual clients.

Figure 7:
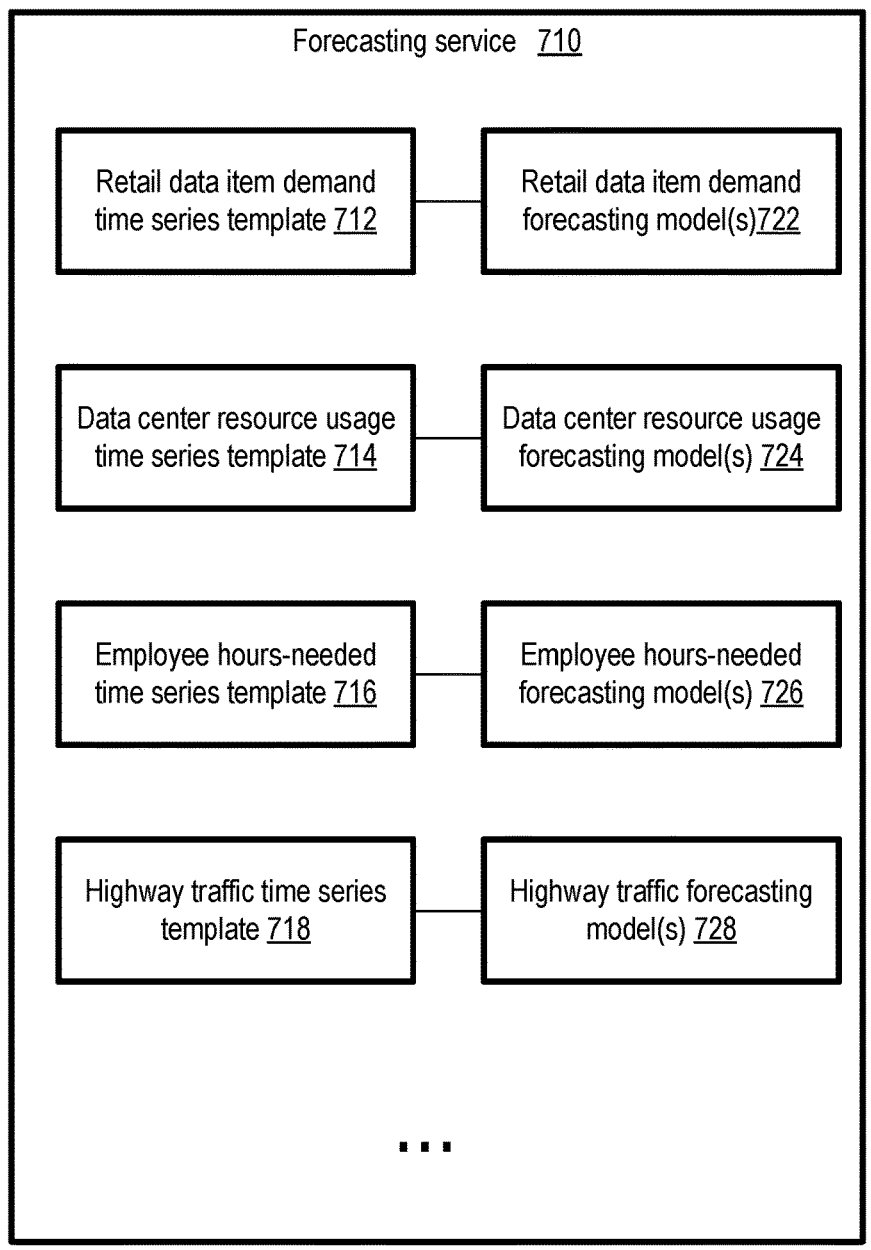
FIG. 7 illustrates an example use-case based templates which may be selected by clients to indicate the type of time series for which forecasts are desired, according to at least some embodiments.

FIG. 7 illustrates an example use-case based templates which may be selected by clients to indicate the type of time series for which forecasts are desired, according to at least some embodiments. Four examples of use case templates, and associated pre-trained or partially-trained composite forecasting models are shown in the depicted embodiment. Template 712 represents a demand forecasting use case for retail items, e.g., items belonging to an e-retailer's catalog; forecasting model(s) 722 may be pre-trained for such demand forecasting problems. The structural characteristics of demand time series may be fairly similar in some cases for various categories of retail items, e.g., sales may peak during pre-holiday seasons, on weekends and the like, and the pre-trained models 722 may comprise state space sub-models that incorporate such characteristics in some embodiments.

Template 714 may represent data center resource usage patterns—e.g. CPU, memory, disk and/or other utilization values that may be collected at fairly fine-grained intervals from various hosts and other computing devices of a cloud infrastructure provider. Models 724 may be pre-trained to generate forecasts for such resource usage time series in some embodiments. Template 716 may represent labor-related time series, e.g., the number of employee-hours needed at various facilities, factories and the like over time. Models 726 may be pre-trained for such time series in at least some embodiments. Templates 718 may represent highway traffic measurements, e.g., collected every hour at various locations in a city or state, in the absence of major accidents and in the presence of major accidents, and models 728 may be pre-trained for generating traffic volume forecasts under various scenarios in the depicted embodiment. Other types of templates and corresponding models may be created and used in various embodiments.

In at least one embodiments, while clients may select templates that seem to be similar to their own use cases when requesting forecasts, they may not be required to do so—e.g., clients may also be able to submit template-less forecast requests. In some embodiments in which a template-based approach similar to that illustrated in FIG. 7 is used, clients may be able to customize some aspects of the template-based models—e.g., while they may select a particular template that is similar to their own use case, they may be permitted to modify one or more learned parameters of the pre-trained models corresponding to that template, before the models are used to generate forecasts.

Example Forecast Model Training Request

Figure 8:
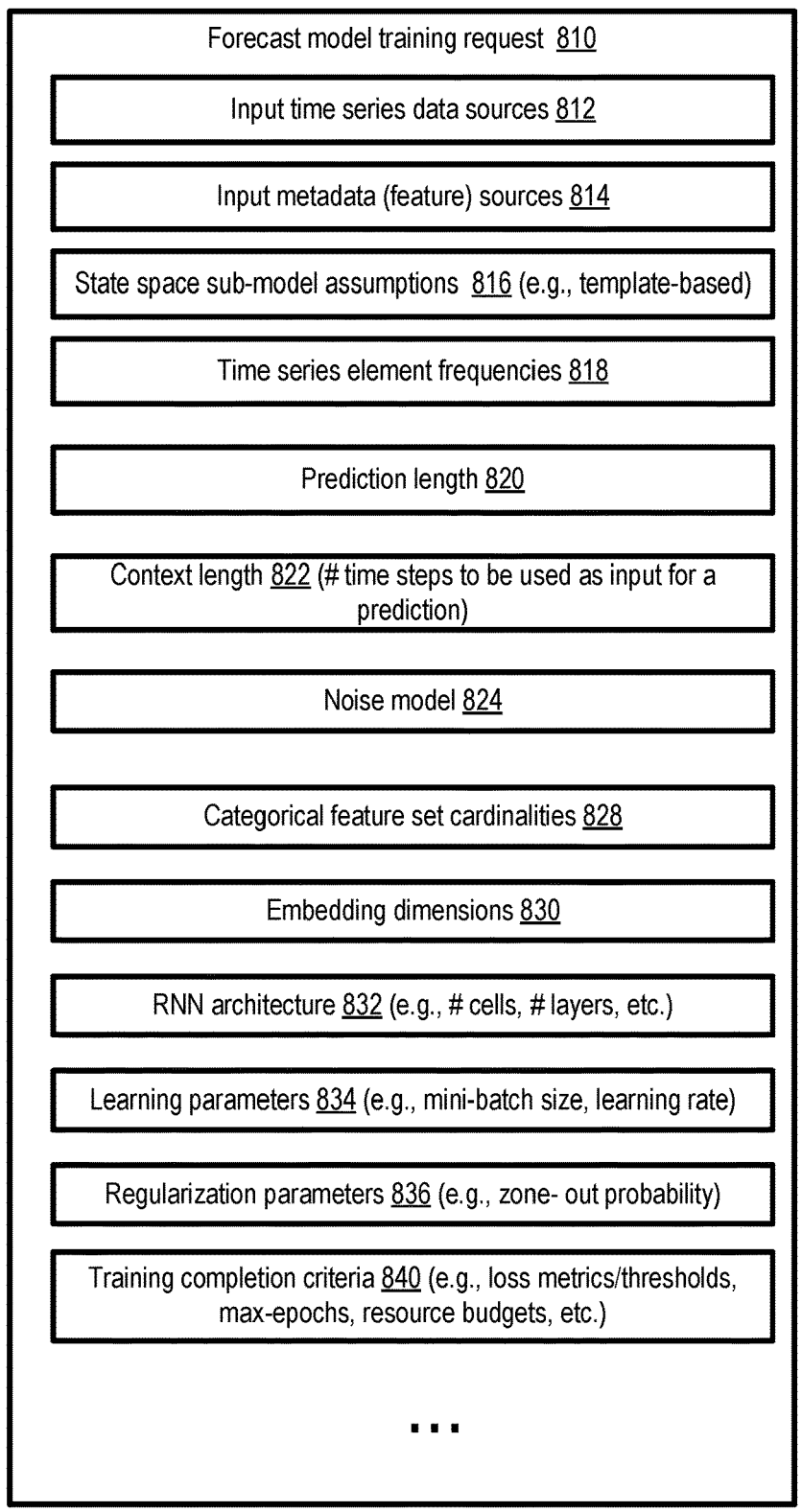
FIG. 8 illustrates example elements of a forecast model training request which may be submitted via a programmatic interface, according to at least some embodiments.

As indicated earlier, in at least some embodiments the training of forecast models may be initiated at a network-accessible forecasting service or tool in response to a programmatic request. FIG. 8 illustrates example elements of a forecast model training request which may be submitted via a programmatic interface, according to at least some embodiments. Individual ones of the example elements may be considered hyper-parameters or meta-parameters of the forecast model (e.g., a composite forecasting model of the kind discussed earlier) in at least some embodiments. Element 812 of forecast model training request may indicate one or more time series data sources 812 which can be used during training of the model(s) (e.g., for loss function computations as discussed earlier), and which may also represent time series for which forecasts are eventually to be generated after the model(s) are trained. One or more sources 814 of metadata or features (e.g., the covariate features discussed earlier) which may also be used for training as well as prediction may be indicated in a training request 810 in the depicted embodiment. In other embodiments, the time series data values and the associated metadata/features may be available from the same sources, so separate metadata sources may not have to be specified.

According to at least one embodiment, a client may provide an indication of one or more state space sub-model assumptions (e.g., whether level trend and/or seasonality patterns are to be assumed, and if so, one or more characteristics of the patterns for various ones of the time series being considered) to be used for a composite forecasting model, e.g., via an assumptions descriptor 816. In one embodiment in which use case templates of the kind discussed above are made available by the forecasting service or tool, and a client requests that a model be specifically trained for the client, the closest use case template may be indicated in such a descriptor 816.

In some embodiments, the time frequencies (or the inter-value time intervals) for one or more of the input time series may be provided via parameter 818 of the forecast model training request 810. In one implementation, for example, the granularity or time frequency of a time series may be indicate using values such as "M" for "monthly", "W" for "weekly", "D" for daily, etc. In at least one embodiment, if a client does not supply the time frequency for a given time series, the forecasting service may compute it (assuming timestamps or some other timing information is provided along with the time values). The desired prediction lengths (the number of future time steps for which values are to be forecast for a given time series) may be indicated via a parameter 820 in the depicted embodiment. The number of time steps whose feature values are to be consumed as input when making a prediction (which may include lagging time steps in some cases) may be indicated via content length(s) parameter 822 in some embodiments.

A noise model 824 (which may also be referred to as a likelihood model) may be indicated in some embodiments, which can be used for uncertainty estimates of the probabilistic forecasts generated by the model. For example, for real-valued data, a Gaussian noise model may be specified, while for real values between 0 and 1 inclusive, a beta noise model may be specified. For time series that comprise non-negative integers, a negative-binomial noise model may be specified via parameter 824 in some embodiments. Other noise models such as student-T or deterministic-L1 may be specified by a client for some types of time series.

In at least one embodiment, a client may indicate a set of categories of which individual ones of the time series may be designated as members—e.g., a client may wish to indicate that among the 100 time series available as input for training the forecast model, 40 belong to category A, 35 to category B and 25 to category C. Such categories may represent another feature of the time series, e.g., at the granularity of individual time series rather than on the per-value granularity. The definitions of the categories (or the semantic distinctions among the categories) may not necessarily have to be provided to the forecasting service in some embodiments. The cardinality of the category set 828 and/or a dimension 830 of an embedding vector to be used to represent category-specific characteristics may be specified in some embodiments in request 810. In an embodiment in which the embedding dimension 830 is specified, the RNN portion of a composite forecasting model may learn an embedding vector of that length for each category, capturing the common properties of the time series of a given category. A larger value of the embedding dimension parameter 830 may allow the model to capture more complex characteristics and/or patterns in various embodiments, but may also increase the number of model parameters to be learned, and may in some cases require more training examples than if a smaller dimension were used. Category features (and associated elements of a training request) at the time series granularity may not be required in at least some embodiments.

In embodiments in which a recurrent neural network of the kind discussed above (e.g., comprising LSTM cells) is to be used for at least a portion of the forecasting model(s), indications of one or more preferred RNN architecture elements 832 may be included in a training request 810. Elements 832 may indicate, for example, the number of cells to be used in one or more layers (e.g., hidden layers) of the RNN, the number of hidden layers, etc.

One or more learning meta-parameters 834 of the forecasting model, e.g., the mini-batch size to be used for gradient descent or other similar learning algorithms, the learning rate to be used, and so on, may be indicated in a training request 810 in the depicted embodiment. Similarly, one or more regularization parameters 836, such as a zone-out probability parameter may be included in the training request 810 in at least some embodiments. In various embodiments, one or more training completion criteria 840 may be indicated in the request 810, to be used to decide whether to continue with further training iterations. Training completion criteria 840 may, for example, indicate one or more metrics (such as quantile errors) to be used to evaluate the model, target thresholds for such metrics, resource or time budgets for the training (e.g., in terms of CPU-seconds, total elapsed time etc., such that the exhaustion of the budget is to be considered a signal to stop the training), the minimum/maximum number of training epochs, and the like in different embodiments.

In various embodiments, clients of a forecasting service may specify only a subset of the elements shown in FIG. 8 for a given forecast model training request, or other elements not shown in FIG. 8 may be specified. In at least some embodiments, the forecasting service or tool to which a training request 810 is directed may have default settings for various meta-parameters (corresponding to the elements of request 810) if client preferences for the meta-parameters are not indicated.

Example Forecast Request

Figure 9:
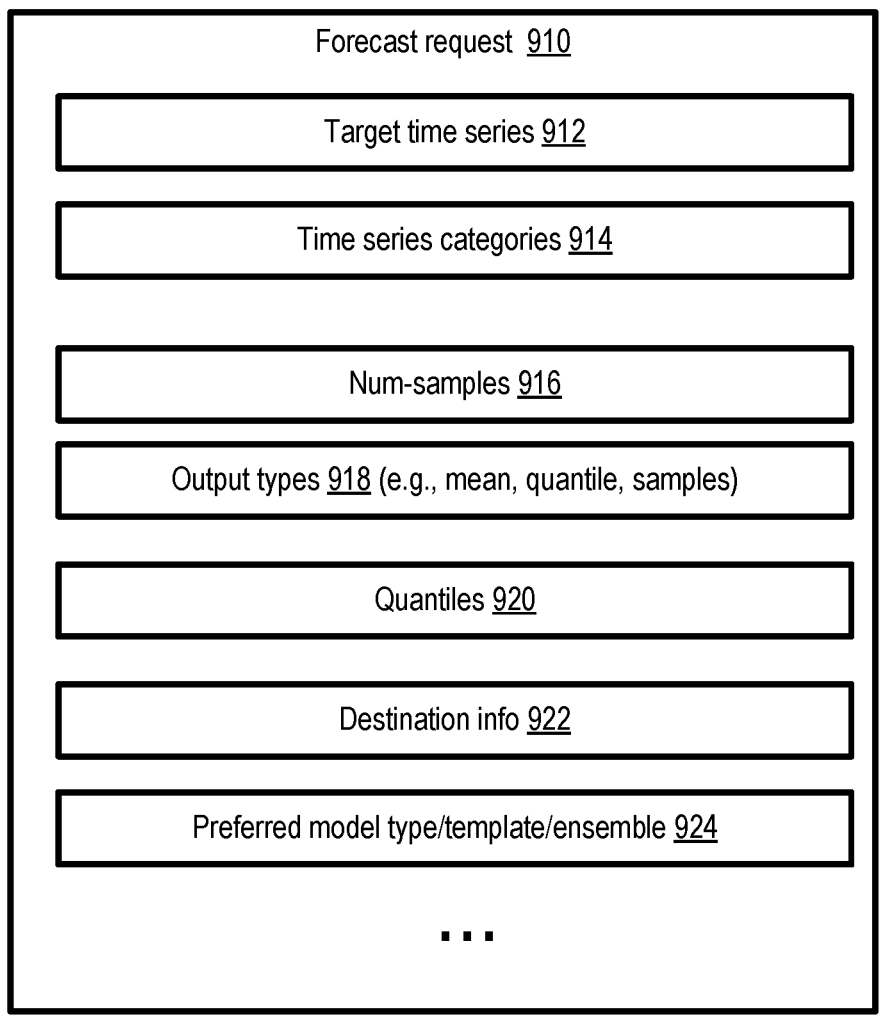
FIG. 9 illustrates example elements of a forecast request which may be submitted via a programmatic interface, according to at least some embodiments.

After a forecasting model has been trained, e.g., in response to a request similar to that described in the context of FIG. 8, a request for a forecast to be generated using the trained model may be submitted via a programmatic interface (e.g., a programmatic interface similar to one of the interfaces 177 of FIG. 1, or interfaces 677 of FIG. 6) to a forecasting service or tool in some embodiments. In one embodiment, such a request may be sent as part of, or together with, a training request 810—e.g., a client may indicate various preferences pertaining to the training process for a forecast model as well as the specific forecasts required in a single programmatic request. FIG. 9 illustrates example elements of a forecast request which may be submitted via a programmatic interface, according to at least some embodiments.

On or more target time series 912 (i.e., time series for which future values are to be predicted) may be indicated in the forecast request 910 in the depicted embodiment. If a target time series is among the input time series that were used for training, in one embodiment an identifier uniquely identifying the time series may be provided, as the values and metadata sources for such a time series may already be known at the forecasting service or tool. For new time series that were not part of the training data, the values and/or associated feature metadata (or sources from which the values and/or metadata can be obtained) may be provided via element 912 in some embodiments. If the option to specify time series categories was used during the training, in the depicted embodiment the respective categories 914 of the target time series may be indicated in the forecast request 910.

As mentioned earlier, in at least some embodiments probabilistic forecasts may be generated using samples from probability distributions of future values. In the depicted embodiment, the number of samples to be generated to estimate the mean, quantiles and/or other estimates for the forecasts may be indicated via element 916. The types of values to be provided in the forecast may be indicated via an output types parameter 918 in some embodiments—e.g., some clients may wish to see just the mean value of the forecast, others may wish to view quantile information for the $90^{th}$ and $50^{th}$ percentile values, and others may wish to view the mean, quantiles as well as the raw samples themselves. If a client wishes to view quantile information, the particular quantiles (e.g., $90^{th}$, $80^{th}$, $50^{th}$, etc.) may be indicated via the quantiles element 920 of the forecast request 910 in the depicted embodiment. An indication of where the forecast results are to be stored/transmitted—e.g., whether they are to be sent to some downstream analysis program, or simply to the submitter of the forecast request—may be indicated via the destination information 922. In some embodiments in which several different models may be available (e.g., composite models of the kind discussed above, other RNN-based models that do not include state space sub-models, non-RNN models etc.,) the particular type of model that should be used for the forecasts, or a use-case template selected from among a set of templates made available by the forecasting service may be indicated via a preferred model type element 924 of the forecast request 910. In at least one embodiment, a client may specify that an ensemble of models, rather than model of a single type, should be used.

In various embodiments, clients of a forecasting service may specify only a subset of the elements shown in FIG. 9 for a given forecast request, or other elements not shown in FIG. 9 may be specified. In at least some embodiments, the forecasting service or tool to which a forecast request 910 is directed may have default settings for various elements, which may be used if a client does not indicate one or more specific preference in the forecast request.

Example Provider Network Environment

Figure 10:
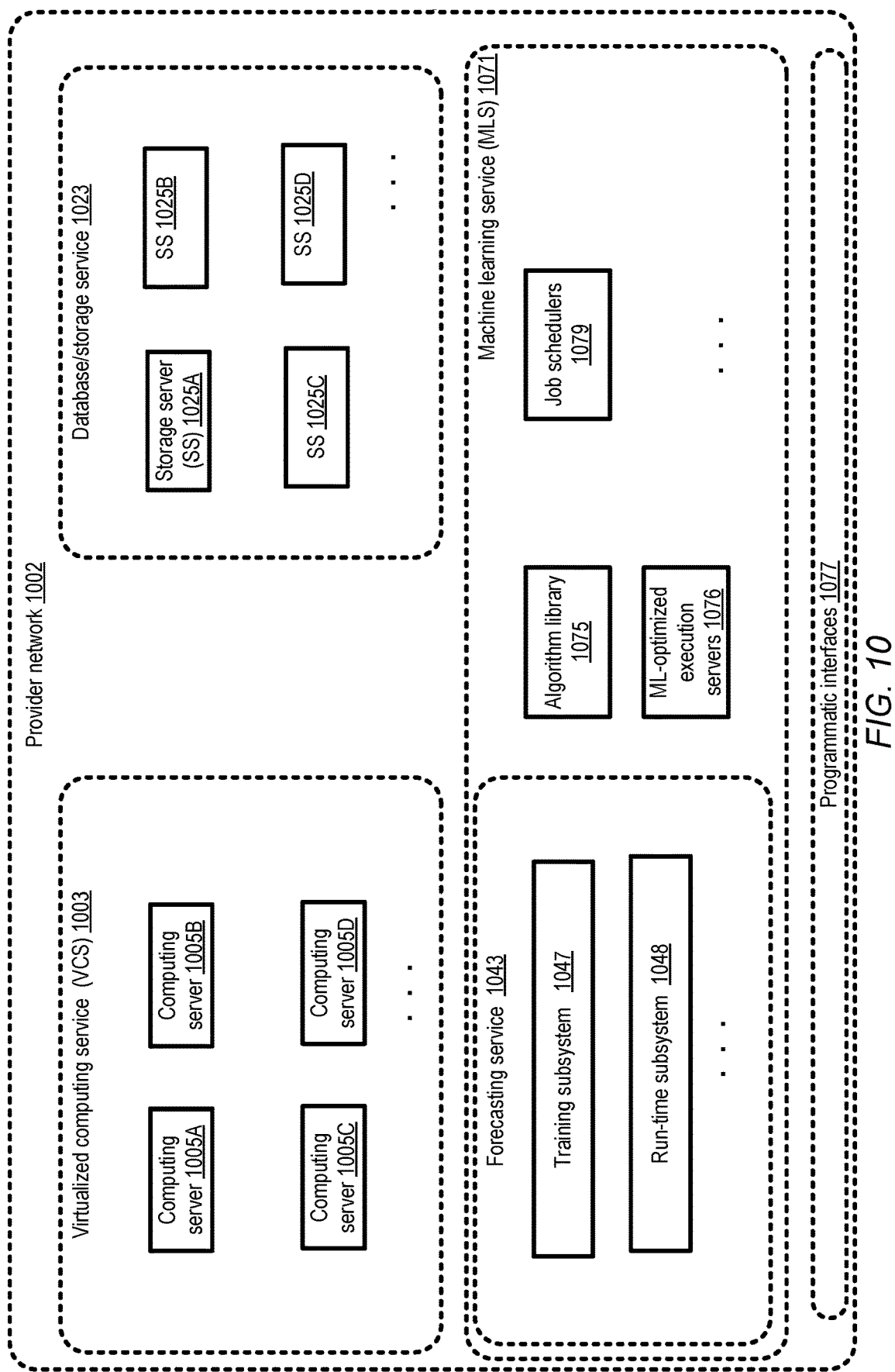
FIG. 10 illustrates an example provider network environment in which a forecasting service may be implemented, according to at least some embodiments.

FIG. 10 illustrates an example provider network environment in which a forecasting service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries).

The services implemented at provider network 1002 in the depicted embodiment may include, for example, a virtual computing service (VCS) 1003, a database/storage service 1023, a forecasting service 1043 and a machine learning service 1071. The forecasting service 1043 may have features and capabilities similar to forecasting service 150 of FIG. 1 in the depicted embodiment. As shown, in some embodiments, the forecasting service 1043 may be implemented as a part of the machine learning service 1071; in other embodiments, the forecasting service 1043 may be implemented as a separate service. The forecasting service 1043 may comprise a training subsystem 1047 and a run-time subsystem 1048 in the depicted embodiment. Each of the services of provider network 1002 may expose respective sets of programmatic interfaces 1077 to its clients in the depicted embodiment, and some of the services may utilize resources of other services (for example, the forecasting service 1043, and/or the machine learning service 1071 may utilize virtual machines instantiated at the virtual computing service 1003 and storage devices provided by the database/storage service 1023). As such, some services of provider network 1002 may act as clients of other services in various embodiments.

At the training subsystem 1047 of the forecasting service, composite forecasting models for time series that include a shared neural network sub-model and a set of state space sub-models similar to those discussed above may be employed in the depicted embodiment, and the trained models may be used at the run-time subsystem 1048 to generate probabilistic forecasts for time series as discussed earlier. Resources from one or more other services may be used, for example, to train the models and/or to execute the trained models. For example, in various embodiments algorithms from algorithm library 1075 of the machine learning service may be executed on behalf of the forecasting service 1043 using a combination of computing servers 1005 (e.g., 1005A-1005D) of the VCS 1003, input data and/or intermediate or final results may be stored using storage servers 1025 (e.g., 1025A-1025D) of the database/storage service, and so on. Job schedulers 1079 of the machine learning service 1071 may schedule long-running machine learning tasks, such as the training of some types of forecasting models of the forecasting service 1043. In some embodiments, special execution servers 1076 (e.g., servers comprising graphics processing units (GPUs) or other processors optimized specifically for machine learning) may be available at the MLS 1071, and may be employed for some of the algorithms/models trained and executed by the forecasting service 1043.

In some embodiments, at least some of the techniques discussed above for training and executing forecasting models may be implemented without acquiring resources of network-accessible services such as those shown in FIG. 10. For example, a standalone tool implemented at one or more computing devices which are not part of a network-accessible service may be used in some embodiments.

Methods for Time Series Forecasting

Figure 11:
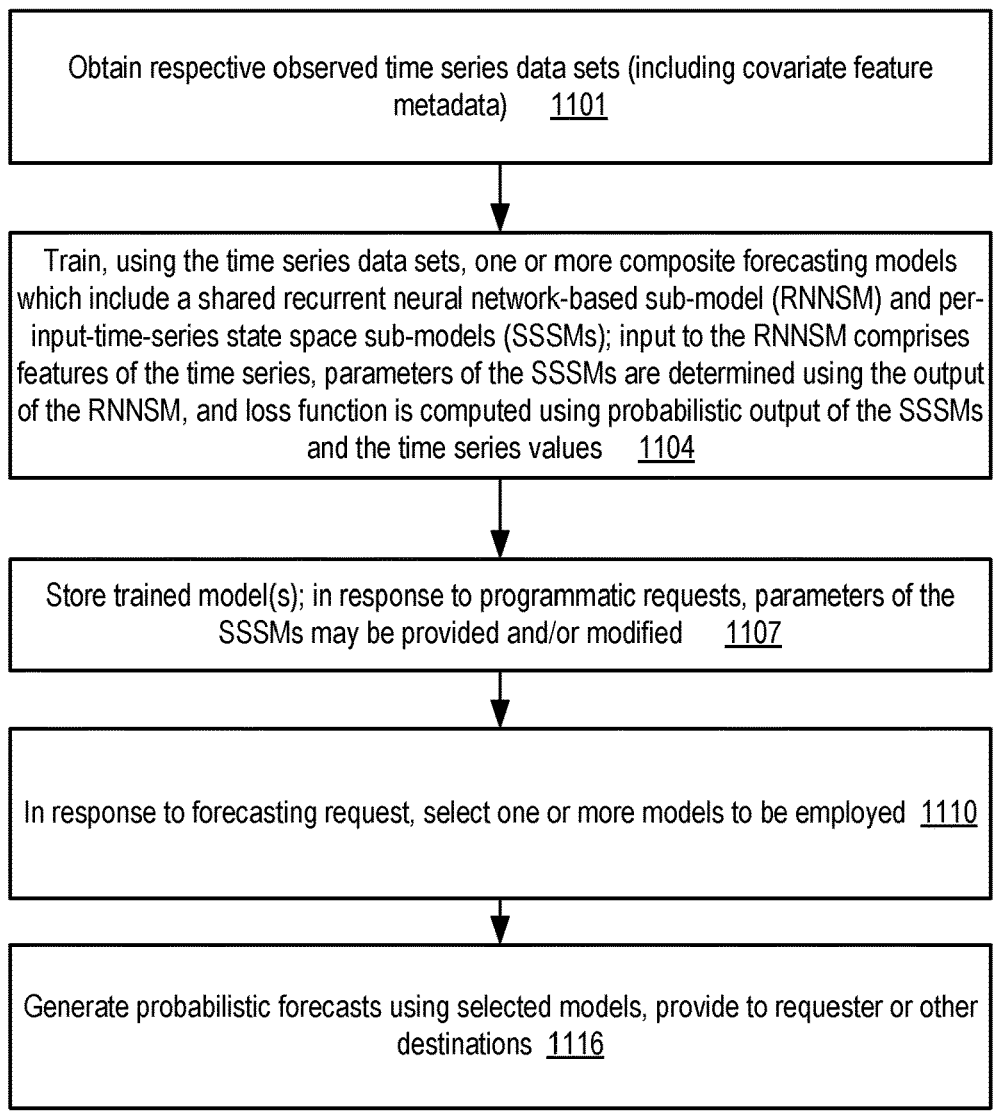
FIG. 11 is a flow diagram illustrating aspects of operations that may be performed to generate time series forecasts using a composite forecasting model which includes a neural network sub-model and one or more state space models, according to at least some embodiments.

FIG. 11 is a flow diagram illustrating aspects of operations that may be performed to generate time series forecasts using a composite forecasting model which includes a neural network sub-model and one or more state space models, according to at least some embodiments. As shown in element 1101, one or more time series data sets may be obtained, e.g., at a forecasting service or machine learning service where models for predicting future values of time series are to be trained in the depicted embodiment. The data sets may comprise time series values that correspond to respective time steps in various embodiments. Metadata features (e.g., in the case of item demand time series, information such as item categories, intervals during which promotions/sales were conducted and so on), which may represent covariate features of the time series, or from which covariate feature values may be generated, may also be obtained in at least some embodiments. Time series pertaining to a variety of problem domains, including for example retail item demands/sales, resource usage measurements at data centers (e.g., how many virtual machines of various sizes were operational at different times), labor-related metrics (e.g., how many worker-hours were required at one or more factories or other facilities of a business entity each day) and the like may be obtained and used for training forecasting models in different embodiments.

Using the time series and associated metadata features, one or more composite forecasting models may be trained (element 1104) in the depicted embodiment. A given composite model may include a shared RNN sub-model (RNNSM) as well as a set of one or more per-time-series state space sub-models (SSSM) in various embodiments. Input to the RNNSM may include, for example, covariate features of one or more time series, and the output of the RNNSM may be used to determine parameters of the SSSMs. The output of the SSSMs may be used, together with the values of the time series, to compute a loss function in at least some embodiments. In some embodiments, the shared neural network portion of a composite model which also includes per-time-series state space sub-models may include a convolutional neural network (CNN)—e.g., instead of an RNNSM, a CNNSM may be used to determine the parameters of the SSSMs. In various embodiments, the shared neural network portion (e.g., an RNN, a CNN, or another kinds of neural network) may be stored using any of a variety of data structures. For example, a neural network may include an input layer of nodes including memory for storing input values, one or more layers of internal or hidden nodes connected to the input layer and comprising memory that includes executable instructions/data for performing operations whose results are used for output layer nodes, and a set of output layer nodes (connected to the internal layers) that include memory for storing output values which are used to determine parameters of the state space sub models.

After the composite forecasting model(s) have been trained, trained versions of the models may be stored (element 1107). In at least one embodiment, in response to programmatic requests, the learned parameters of one or more SSSMs may be provided. In one embodiment, one or more parameters of the SSSMs may be modified in response to programmatic requests. In response to a particular forecasting request, one or more forecasting models may be selected for execution in various embodiments (element 11103). Using the selected models, probabilistic forecasts may be generated and provided to the requesters and/or other destinations such as downstream automated forecast consumer services or systems in some embodiments (element 1113).

It is noted that in various embodiments, at least some operations other than those illustrated in the flow diagrams of FIG. 11 may be used to implement the meta-parameter optimization techniques described above. Some of the operations shown may not be implemented in some embodiments or may be implemented in a different order, or in parallel rather than sequentially.

Use Cases

The techniques described above, of utilizing composite models which incorporate state space sub-models and shared RNNs to generate probabilistic forecasts for various kinds of time series may be extremely useful in a number of scenarios. The inventories of many retailers, including Internet-based retailers, may often include large numbers of relatively infrequently-sold items such as shoes, luggage, clothing, various luxury items, and the like, as well as some items that sell much more frequently. The time required to replenish supplies of various items may vary—some orders for the items may be fulfilled within a few days, while others may take weeks or months. The forecasting methodology described may be able to predict item-specific demands over various future periods with high confidence levels in a timely manner, without requiring excessive amounts of compute power or large training data sets for the items. The forecasts produced may be used as input to a number of automated systems, including but not limited to order management systems, discount/promotion planning systems, facilities planning systems, or product placement planning systems for physical (e.g., walk-in) retail locations. Similarly, for other problem domains such as human resources planning, automated data center resource provisioning/planning, traffic modeling/planning, autonomous vehicle or robot trajectory planning and the like, the forecasting techniques described may be able to generate high-quality forecasts using relatively short time series, thereby potentially leading to substantial reduction in resource usage and time required for training the forecasting models. Insights into the internal operations of the composite models may be provided by allowing users to inspect and/or modify parameters of the state space sub-models. Use case template-based composite models may be provided to further simplify the user experience—e.g., a user may simply select a similar use case to their own use case from a menu of templates, and a composite model trained to handle time series that correspond to the user's requirement may be used to quickly generate desired forecasts.

Illustrative Computer System

Figure 12:
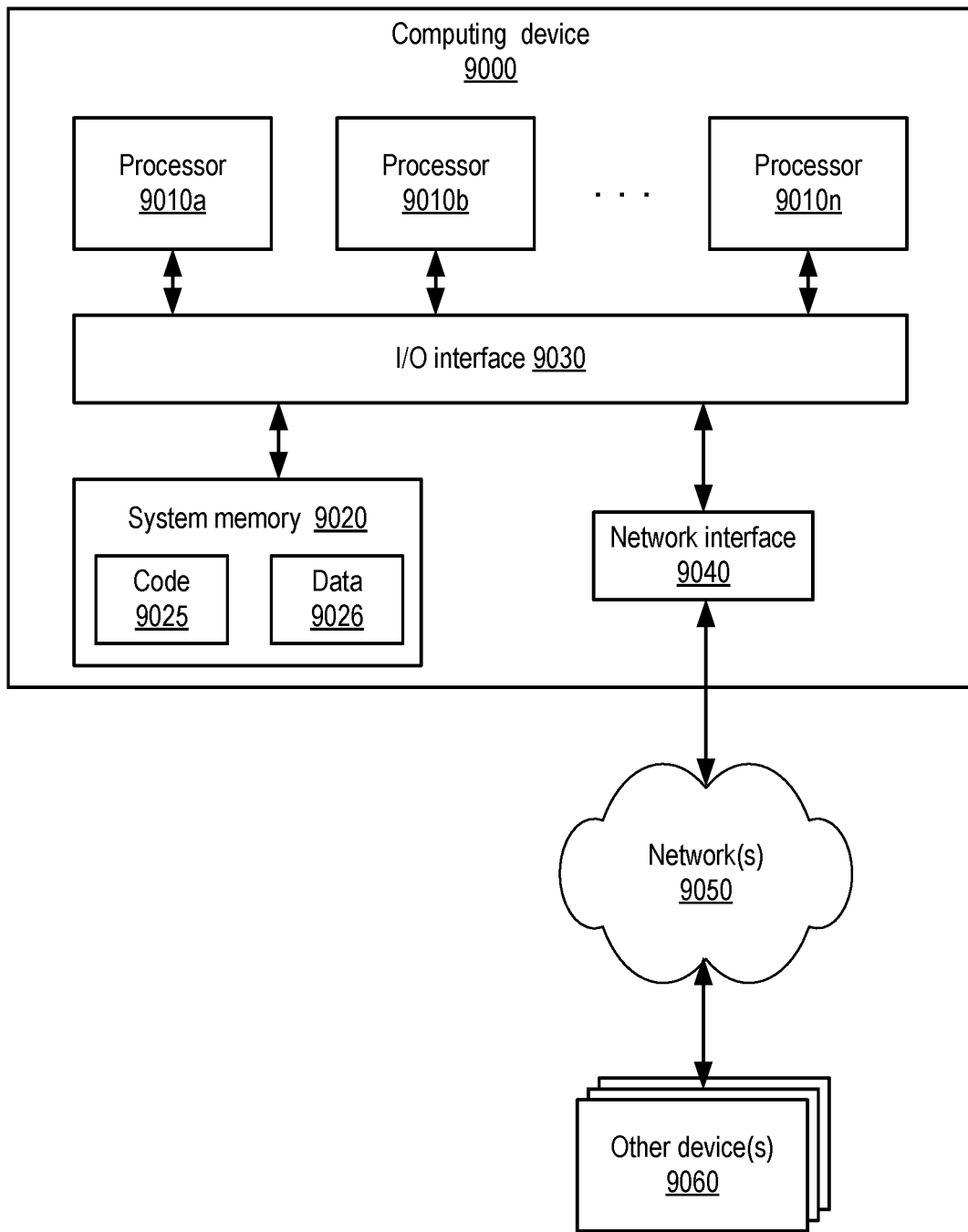
FIG. 12 is a block diagram illustrating an example computing device that may be used in at least some embodiments.

In at least some embodiments, a server that implements a portion or all of one or more of the technologies described herein, including the composite model forecasting techniques, as well as various components of a machine learning service or a forecasting service may include a general-purpose computer system that includes or is configured to access one or more computer-accessible media. FIG. 12 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 11, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 11 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices of an artificial intelligence service for a composite time series forecasting model;
wherein the one or more computing devices of the artificial intelligence service are configured to:
obtain an indication of (a) one or more time series, wherein individual ones of the one or more time series comprise a sequence of observation values corresponding to respective time steps and (b) respective descriptive metadata corresponding to at least some time series of the one or more time series;
train a composite forecasting model comprising one shared recurrent neural network sub-model and one or more state space sub-models, wherein individual ones of the state space sub-models correspond to the individual ones of the one or more time series comprising the sequence of observation values, wherein a first state space sub-model of the one or more state space sub-models comprises a state transition formulation and a probabilistic value generation formulation, and wherein, during training of the composite forecasting model,
input to the one shared recurrent neural network sub-model (a) comprises feature sets representing the respective descriptive metadata and (b) does not include observation values of the one or more time series;
one or more parameters of at least the first state space sub-model is determined based at least in part on output of the one shared recurrent neural network sub-model; and
a loss function of the composite forecasting model is based at least in part on (a) a probabilistic value generated at the first state space sub-model and (b) an observation value of a particular time series corresponding to the first state space sub-model;
store a trained version of the composite forecasting model; and
provide, to one or more destinations, a probabilistic forecast pertaining to a particular time series, wherein the probabilistic forecast is obtained using the trained version of the composite forecasting model.

2. The system as recited in claim 1, wherein at least one state space sub-model of the one or more state space sub-models comprises a linear state space sub-model with a deterministic transition matrix and a random innovation term, wherein a latent state representation in the linear state space sub-model encodes one or more of: a level, trend or seasonality factor.

3. The system as recited in claim 1, wherein the probabilistic value generation formulation comprises a univariate Gaussian distribution.

4. The system as recited in claim 1, wherein at least one feature set of the respective feature sets comprises one or more time-independent values.

5. The system as recited in claim 1, wherein the one or more computing devices are configured to:

determine that a programmatic request to train the composite forecasting model has been submitted, wherein training of the composite forecasting model is initiated in response to the programmatic request.

6. A method, comprising:
performing, by one or more computing devices of an artificial intelligence service:
obtaining an indication of one or more time series, wherein individual ones of the one or more time series comprise a sequence of observation values corresponding to respective time steps;
training, using at least the one or more time series, a composite forecasting model comprising one recurrent neural network sub-model and one or more state space sub-models, wherein individual ones of the state space sub-models correspond to the individual ones of the one or more time series comprising the sequence of observation values, wherein during training of the composite forecasting model,
one or more parameters of at least a first state space sub-model of the one or more state space sub-models is determined based at least in part on output of the one recurrent neural network sub-model; and
a loss function of the composite forecasting model is based at least in part on (a) a probabilistic output of the first state space sub-model and (b) an observation value of a particular time series corresponding to the first state space sub-model; and
storing a trained version of the composite forecasting model.

7. The method as recited in claim 6, further comprising performing, by the one or more computing devices:
obtaining respective descriptive metadata corresponding to at least some time series of the one or more time series, wherein during training, input provided to the one recurrent neural network sub-model comprises feature sets representing the respective descriptive metadata.

8. The method as recited in claim 6, wherein during training, input provided to the one recurrent neural network sub-model comprises respective observation values of the one or more time series.

9. The method as recited in claim 6, further comprising performing, by the one more computing devices:
in response to a determination that a first request has been submitted via a programmatic interface, providing an indication of a parameter of the first state space sub-model.

10. The method as recited in claim 6, further comprising performing, by the one more computing devices:
in response to a determination that a parameter modification request has been submitted via a programmatic interface, modifying a particular parameter of the first state space sub-model; and
generating, using the modified version of the particular parameter, a probabilistic forecast for the particular time series.

11. The method as recited in claim 6, further comprising performing, by the one more computing devices:
causing an indication of a plurality of forecasting use case templates to be provided via a programmatic interface, wherein the plurality of forecasting use case templates comprises (a) an item demand template and (b) a resource consumption template;
determining that an indication of a particular forecasting use case template has been provided via a programmatic interface; and
providing a forecast generated using a particular composite forecasting model, wherein the particular composite forecasting model is trained using a data set corresponding to the particular forecasting use case template.

12. The method as recited in claim 6, wherein the first state space sub-model comprises a state transition formulation, the method further comprising, by the one or more computing devices:
determining, based at least in part on an analysis of at least some values of the particular time series, at least a portion of the state transition formulation.

13. The method as recited in claim 6, wherein the one recurrent neural network sub-model comprises one or more LSTM (long short term memory) units.

14. The method as recited in claim 6, wherein the training comprises utilizing a Kalman filtering algorithm.

15. The method as recited in claim 6, wherein the training is responsive to a programmatic request, wherein the programmatic request comprises one or more request parameters indicating one or more hyper-parameters to be used to train the composite forecasting model, wherein a particular hyper-parameter comprises one or more of: (a) a time frequency of the one or more time series, (b) an indicator of a number of predictions to be generated for a time series, (c) an indicator of a number of time series time steps to be consumed as input to generate a prediction, (d) an indication of a noise model to be used for uncertainty estimates, (e) a number of training epochs, (f) a cardinality of a categorical feature associated with individual ones of the time series, (g) an embedding dimension to be used to characterize categories of time series, (h) a number of cells within a layer of the one recurrent neural network sub-model, (i) a number of layers of the one recurrent neural network sub-model, (j) a mini-batch size to be used during the training, (k) a learning rate to be used during the training, (l) a regularization parameter, (m) a training completion criterion, (n) the loss function, or (o) an indication of one or more properties of the first state space sub-model.

16. A non-transitory computer-accessible storage medium storing program instructions that when executed on one or more processors of an artificial intelligence service for a composite forecasting model cause the one or more processors to:
train, using at least one or more time series, the composite forecasting model comprising one neural network sub-model and one or more state space sub-models, wherein individual ones of the state space sub-models correspond to individual ones of the one or more time series comprising a sequence of observation values corresponding to respective time steps, wherein during training of the composite forecasting model,
one or more parameters of at least a first state space sub-model of the one or more state space sub-models is determined based at least in part on output of the one neural network sub-model; and
a loss function of the composite forecasting model is based at least in part on (a) a probabilistic output of the first state space sub-model and (b) an observation value of a particular time series corresponding to the first state space sub-model; and
store a trained version of the composite forecasting model.

17. The non-transitory computer-accessible storage medium as recited in claim 16, wherein the instructions when executed on the one or more computing devices:

obtain respective descriptive metadata corresponding to at least some time series of the one or more time series, wherein during training, input provided to the one neural network sub-model comprises feature sets representing the respective descriptive metadata.

18. The non-transitory computer-accessible storage medium as recited in claim 16, wherein the instructions when executed on the one or more computing devices:

in response to a determination that a first request has been submitted via a programmatic interface, provide an indication of a parameter of the first state space sub-model.

19. The non-transitory computer-accessible storage medium as recited in claim 16, wherein the instructions when executed on the one or more computing devices:

in response to a determination that a parameter modification request has been submitted via a programmatic interface, modify a particular parameter of the first state space sub-model; and generate, using the modified version of the particular parameter, a probabilistic forecast for the particular time series.

20. The non-transitory computer-accessible storage medium as recited in claim 16, wherein the instructions when executed on the one or more computing devices:

cause an indication of a plurality of forecasting use case templates to be provided via a programmatic interface;

determine that an indication of a particular forecasting use case template has been provided via a programmatic interface; and provide a forecast generated using a particular composite forecasting model, wherein the particular composite forecasting model is trained using a data set corresponding to the particular forecasting use case template.

21. The non-transitory computer-accessible storage medium as recited in claim 16, wherein the one neural network sub-model comprises a convolutional neural network.

22. The non-transitory computer-accessible storage medium as recited in claim 16, wherein the instructions when executed on the one or more computing devices:

apply a power transformation to observation values of the one or more time series during training of the composite forecasting model, wherein one or more parameters of the power transformation are learned by the one neural network sub-model during the training; and prior to providing a response to a forecast request, apply an inverse power transformation to a probabilistic forecast generated by a trained version of the composite forecasting model.

\* \* \* \* \*